(12) United States Patent
Wolff et al.

(10) Patent No.: US 7,305,114 B2
(45) Date of Patent: Dec. 4, 2007

(54) HUMAN/MACHINE INTERFACE FOR A MACHINE VISION SENSOR AND METHOD FOR INSTALLING AND OPERATING THE SAME

(75) Inventors: Robert Wolff, Sherborn, MA (US); William Silver, Weston, MA (US)

(73) Assignee: Cognex Technology and Investment Corporation, Mt. View, CA (US)

( * ) Notice: Subject to any disclaimer, the term of this patent is extended or adjusted under 35 U.S.C. 154(b) by 504 days.

(21) Appl. No.: 10/036,310

(22) Filed: Dec. 26, 2001

(65) Prior Publication Data

US 2003/0120714 A1   Jun. 26, 2003

(51) Int. Cl.
| | |
|---|---|
| G06K 9/00 | (2006.01) |
| G06K 9/62 | (2006.01) |
| G06K 9/40 | (2006.01) |
| H04N 7/18 | (2006.01) |
| H04N 9/47 | (2006.01) |
| H04N 7/00 | (2006.01) |

(52) U.S. Cl. ............... 382/141; 382/153; 382/155; 382/254; 348/86; 348/113; 348/175; 348/211.99; 700/96

(58) Field of Classification Search ........... 382/141, 382/143–144, 157, 254–255, 153, 155–159; 700/95–96; 348/86, 125, 14.02–14.03, 64, 348/113–114, 175–176, 211.99, 211.1–211.6
See application file for complete search history.

(56) References Cited

U.S. PATENT DOCUMENTS

| | | | | |
|---|---|---|---|---|
| 4,641,356 | A | * | 2/1987 | Sternberg ............... 382/257 |
| 4,975,972 | A | * | 12/1990 | Bose et al. ............... 382/149 |
| 4,985,846 | A | * | 1/1991 | Fallon ............... 382/153 |
| 5,040,228 | A | * | 8/1991 | Bose et al. ............... 382/141 |
| 5,673,334 | A | * | 9/1997 | Nichani et al. ............... 382/143 |
| 5,715,051 | A | * | 2/1998 | Luster ............... 356/239.1 |
| 5,768,401 | A | * | 6/1998 | Csipkes et al. ............... 382/255 |
| 5,821,993 | A | * | 10/1998 | Robinson ............... 348/187 |
| 5,982,362 | A | | 11/1999 | Crater et al. |
| 6,381,357 | B1 | * | 4/2002 | Tan et al. ............... 382/141 |
| 6,427,099 | B1 | | 7/2002 | Heinemann |

(Continued)

OTHER PUBLICATIONS

Nancy Cadjan, Technical Writer, Jan. 2000, Upgrading Novell Client Software Across the Network Using ACU.exe.*

Primary Examiner—Bhavesh M Mehta
Assistant Examiner—Manav Seth
(74) Attorney, Agent, or Firm—William A. Loginov

(57) ABSTRACT

This invention overcomes the disadvantages of the prior art by providing a human/machine interface (HMI) for use with machine vision systems (MVSs) that provides the machine vision system processing functionality at the sensor end of the system, and uses a communication interface to exchange control, image and analysis information with a standardized, preferably portable device that can be removed from the MVS during runtime. In an illustrative embodiment, this portable device can be a web-browser equipped computer (handheld, laptop or fixed PC) or a Personal Digital Assistant (PDA). The communication interface on the sensor-end of the system is adapted to communicate over a cable or wireless communication link (for example infrared (IR) or radio frequency (RF)), with a corresponding communication interface in the portable device. The data communicated over the interconnect or link is formatted so that it is read at a data speed and level of resolution (pixel count) that is appropriate to the portable device by use of an image processor at the sensor end.

31 Claims, 19 Drawing Sheets

U.S. PATENT DOCUMENTS

| | | |
|---|---|---|
| 6,438,575 B1 | 8/2002 | Khan et al. |
| 6,466,203 B2 | 10/2002 | Van Ee |
| 6,531,707 B1 * | 3/2003 | Favreau et al. ........ 250/559.46 |
| 6,567,122 B1 * | 5/2003 | Anderson et al. ........ 348/211.3 |
| 6,670,991 B1 * | 12/2003 | Takagi et al. ............... 348/349 |
| 6,804,418 B1 * | 10/2004 | Yu et al. ..................... 382/299 |

* cited by examiner

HUMAN/MACHINE INTERFACE FOR A MACHINE VISION SENSOR AND METHOD FOR INSTALLING AND OPERATING THE SAME

FIELD OF THE INVENTION

This invention relates to machine vision systems, and more particularly to human/machine interfaces for training, controlling and monitoring machine vision system sensors and methods for installing and configuring such interfaces.

BACKGROUND OF THE INVENTION

Machine vision systems are used for a growing variety of manufacturing and inspection processes in research and industry. A machine vision system enables a user to monitor subject parts and workpieces, either at stationary locations or on moving lines, and to compare acquired images of the subjects to trained patterns, stored in a memory.

FIG. 1 shows a typical arrangement for a basic machine vision system 100 according to the prior art. An image sensor unit 102 is directed at an object (exemplary gear 104) within the viewing area 108 of the image sensor 102. The sensor includes a lens 110 of appropriate viewing angle, aperture and magnification. These parameters can be varied, either by remote control, automatic adjustment or manually. The lens transmits viewed light to the electro-optical pickup, which can be a charge couple device (CCD) 112. Basic interfaces (not shown) can be included, which interact with the sensor circuitry—such as triggers and strobes. Such interfaces are used to direct the capture of images, operate shutters, illumination and carry out other basic image acquisition functions. Likewise, integral or remote illumination 114 can be linked to the sensor, and operate during image acquisition, power-on or upon occurrence of another desired event. This illumination is directed at the viewing area 108 in this example. The viewing area 108 can, itself, include a backlight for contrasting the object 104.

The sensor unit 102 is connected by cabling 120 to an image processor/machine vision card 122. This card can be connected via a bus (such as a Peripheral Component Interface (PCI) bus) 123 to an appropriate bus slot of the personal computer (PC) or workstation 124. It can reside within, or remote from, the computer chassis. The machine vision card 122 is a specialized piece of hardware and firmware that includes a framegrabber, data sampling, compression/decompression algorithms and other functions needed to effect rapid capture and conversion of image data from the sensor into bus-based, computer-readable data. It may also include various control interfaces for transmitting computer-generated instructions back to the sensor to control various imaging functions, as well as trigger, strobe and illumination functions.

The computer 124 is typically configured with a conventional operating system, such as Windows® NT, from Microsoft Corporation of Redmond, Wash., open source Linux, or another similar operating system, which supports a display 126 with a graphical user interface (GUI). The GUI is manipulated by a keyboard 128, mouse 130 and other appropriate user interfaces (such as a touchscreen). The display can be used to show real time and stored images 132 of the object 108, and text or GUI control buttons by which the image can be analyzed or manipulated. A variety of other machine vision functions and tools can also be provided, all of which are part of a generalized machine vision application 140, stored on disk, and loaded as needed by the system.

In one example, these tools allow a user to train the system to recognize certain image parameters, act upon those parameters and deliver test data and/or decision functions to the user. One such decision function may be whether to operate a robot, manipulator or conveyor with respect to the viewed object to accept or reject the object. An appropriate interface to a robot controller or other responsive mechanism 142 can be provided. Likewise, the mechanism 142 can deliver signals to the computer (for example a conveyor/part advance signal) that instructs capture of an image or other related operation at the sensor. Note that, in the alternative, the vision system can be implemented as a basically stand-alone unit that does not utilize a separate PC with a full operating system and file system to carry out the above-described vision system functions. In this case, the unit could include a purpose-built operating system and hardware to carry out the machine vision function, display and any associated operator interface function.

The computer 124 may be connected to a number of sensor units and/or inspection areas throughout a work area. Similarly, the computers may be networked via a conventional network interface to a main server and/or central management computer. In general, the PC has become the preferred choice for providing a human/machine interface (HMI) because of it's versatility, relatively low cost, standardization, wide availability, ease of use and familiarity for a wide range of users. The typical HMI allows the user to perform a variety of interactive functions with the machine vision system (MVS). In particular, machine vision HMI requires five general categories of operations that must be performed by users (e.g. installers, technicians, engineers, operators, and/or supervisors):

Installation—A machine vision sensor must be mounted at an appropriate position and attitude in space so that it sees the desired field of view. The lens must be focused, and its aperture must be set to admit an appropriate amount of light. Additionally, an object or pattern of known size and shape is typically used to calibrate the sensor to a real-world coordinate system. MVS installation has traditionally required a mechanism for the human installer to see live, real time images generated by the sensor.

Configuration—A user chooses appropriate operating parameters that specify such things as how images are to be acquired, the machine vision operations to be performed, the acceptance criteria, and how the results are to be communicated. Configuration requires a mechanism for a user to enter numeric, Boolean, enumerated, text string, and other parameters, and communicate such parameters to the MVS.

Training—Training typically requires that a user place an example of the object(s) to be analyzed by the MVS in its field of view, and then interact with the sensor as appropriate so that the sensor can learn necessary details of the object's visual appearance for subsequent analysis during production. Training generally requires a mechanism for displaying an image of the object to the human conducting the training procedure, and a mechanism for allowing the human trainer to choose points, lines, rectangles, and other shapes and HMI objects as appropriate.

Control—a HMI mechanism must be provided to allow users to control the operating state of the MVS, including placing it into operating states suitable for Installation, Configuration, Training, Diagnosis, Production, and Standby. A mechanism for other control operations such as MVS reset should be provided.

Monitoring—a HMI mechanism is typically provided to allow human users to monitor the operation of the MVS during production. Data to be provided to people for monitoring purposes includes images of the objects being analyzed, accept/reject statistics, numeric quality scores, and trends. Information about both the last object analyzed and the last object rejected is often useful.

It should be clear that the above-described Installation, Configuration, Training Control and Monitoring procedures are highly computer-centric, requiring a relatively fully configured PC with display and user interface to be deployed for each sensor or group of sensors in the work area. While the PC (laptop and desktop) is a powerful tool for providing a HMI, the cost of laptop and desktop PCs has not fallen appreciably over the past several years—due, in part, to their large component-count, complexity and continued improvement by manufacturers as a tradeoff against constant unit cost. Much of this increased computing power may be unnecessary for a standard MVS HMI. In addition, the weight and size of PCs and their displays has limited by their ergonomics. In other words, keyboards, mice, hard drives and displays take up space and cannot be overly miniaturized. There are also hidden costs to operating one or more PCs as HMIs. The PC's complexity means that it typically requires periodic intervention by costly Information Technology professionals to repair and upgrade operating system, networking and application software. Conversely, the size, and cost of machine vision sensors has continued to fall over the years, and they have been deployed at an increasing number of locations within production environments. A fully configured, current model PC may not provide the ideal HMI solution for all MVS applications.

In fact, there are many processes using a minimal number of trained vision procedures (for example a gear inspection process) where, once trained, the system may need little or no intervention by an user/operator for several weeks or months. It may be desirable to deploy such basic machine vision systems at a large number of locations around a production facility. Given the low cost and minimal intervention required for such systems it is desirable to provide an inexpensive HMI that enables easy installation, configuration, training and monitoring by a user/operator without requiring a bulky and expensive fixed-base PC that is permanently tied to the MVS. In this manner installation and operational costs can be significantly lowered. Alternatively, providing an interface on a remote fixed laptop or desktop PC that uses only a universal software application, such as a web browser, to interface with the sensor(s) would be quite desirable.

One possible candidate for a universal, portable HMI is the Personal Digital Assistant (PDA), also sometimes termed a "palmtop" computer. Within the past few years the PDA has become increasingly common, the most popular example being the Palm Computing® platform developed by 3Com Corporation, and sold by a variety of vendors including Palm, Inc. of Santa Clara, Calif. These devices sell for approximately one-tenth the cost of a PC, and around one-twentieth the size and weight. PDAs are capable in principle of machine vision HMI, since they have the four necessary elements—a display, a human input device, an interface that could be connected to an MVS, and available HMI software building blocks.

PDAs present significant obstacles to their use for machine vision HMI, however. The display is quite limited in resolution, both spatially (i.e. in pixels) and in intensity (i.e. number of gray levels). Both the spatial and intensity resolution are far less than that used by even the least capable machine vision sensor. PDA communication interfaces that could be used for the MVS (serial and infrared) are similarly limited in performance, operating at much less than the bandwidth needed for full real-time image display. The processing power of a typical PDA may be around 100 times less than a typical PC, and generally much less than an MVS, which may limit the ability to use the processor to overcome other limitations. For example, using sophisticated image compression algorithms to overcome the interface bandwidth limits may not be practical. Finally, installing and maintaining the right MVS software on a PDA might incur hidden costs. Hence, it is highly desirable to provide a manner to overcome these obstacles, and/or provide an effective HMI that can be applied to a more-generalized PC software and hardware architecture.

SUMMARY OF THE INVENTION

This invention overcomes the disadvantages of the prior art by providing a human/machine interface (HMI) for use with machine vision systems (MVSs) that provides the machine vision system processing functionality at the sensor end of the system, and uses a communication interface to exchange control, image and analysis information with a standardized, preferably portable HMI device. Significantly, the HMI device can be disconnected from the sensor during runtime of the sensor, and the sensor's internal processing element can carry on machine vision tool activity as configured by the HMI device.

In an illustrative embodiment, this portable device can be a web-browser equipped computer (handheld, laptop or fixed PC), a Personal Digital Assistant (PDA), or another form of remote computing device that can be configured to include a generic web-browser application or another specialized interface application. The communication interface on the sensor-end of the system is adapted to communicate over a cable interconnect (serial, Ethernet, Universal Serial Bus (USB (Version 1.0/2.0)), or a wireless communication link (for example infrared (IR) or radio frequency (RF)), with a corresponding communication interface in the portable device. The data communicated over the interconnect or link is formatted so that it is read at a data speed and level of resolution (pixel count) that is appropriate to the portable device by use of an image processor at the sensor end. The processor, accordingly includes an application that supports transmission and receipt of data in a desired portable-device compatible format and speed including a Transport Control Protocol/Internet Protocol (TCP/IP) format for web browser viewing and a PDA data-transmission format recognized by the PDA. A resident PDA application can be employed to provide the PDA-end of the machine vision application for interacting with the sensor. The PDA machine vision application can be preloaded, or can be downloaded from the sensor, given an appropriate instruction to do so. Alternatively, the PDA can have a generic application that allows creation of appropriate control buttons and displays by the sensor-resident application (that are relevant to the given sensor) as needed. In this manner, an up-to-date version of the PDA-resident software is always provided to the PDA, and perfectly matches the version in the subject sensor. In addition, a single PDA can be assured of interfacing with a wide variety of types and versions of sensors throughout a production facility or multiple facility organization Where a PDA or other limited-display-capability device is employed, the sensor can include appropriate data compression software for reducing the transmitted data to a compatible gray level and screen resolution. Certain image-enhancing processes can also be employed to increase resolution where needed. For focus and aperture adjustment, or other like activities where real time higher-definition imaging is needed, the sensor can include software processes that generate encoded data representative of the intensity range and relative degree of focus. These are transferred as encoded data to the PDA, and displayed as current and maximum intensity range and focus level.

BRIEF DESCRIPTION OF THE DRAWINGS

The invention description below refers to the accompanying drawings, of which.

DETAILED DESCRIPTION OF ILLUSTRATIVE EMBODIMENTS

I. System Overview

Figure 1:
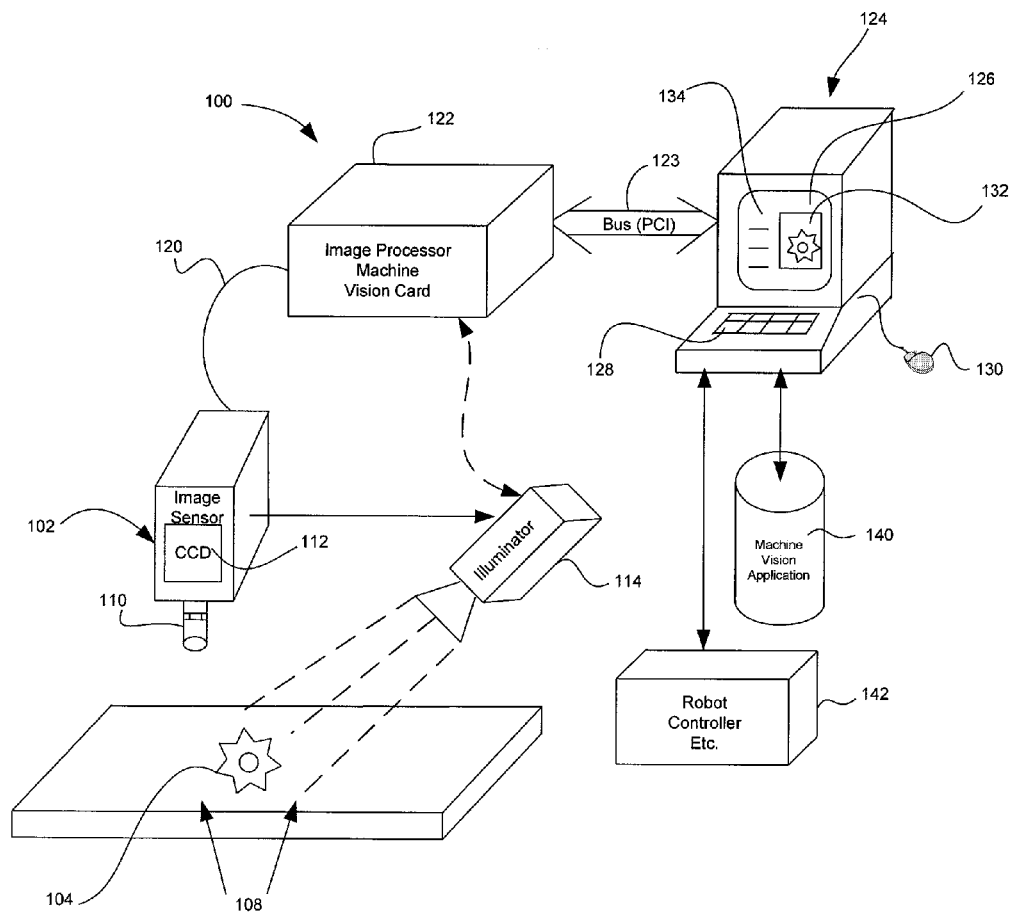
FIG. 1, already described, is schematic diagram of a basic arrangement for a machine vision system having a human/machine interface configured in a personal computer according to the prior art.
Figure 2:
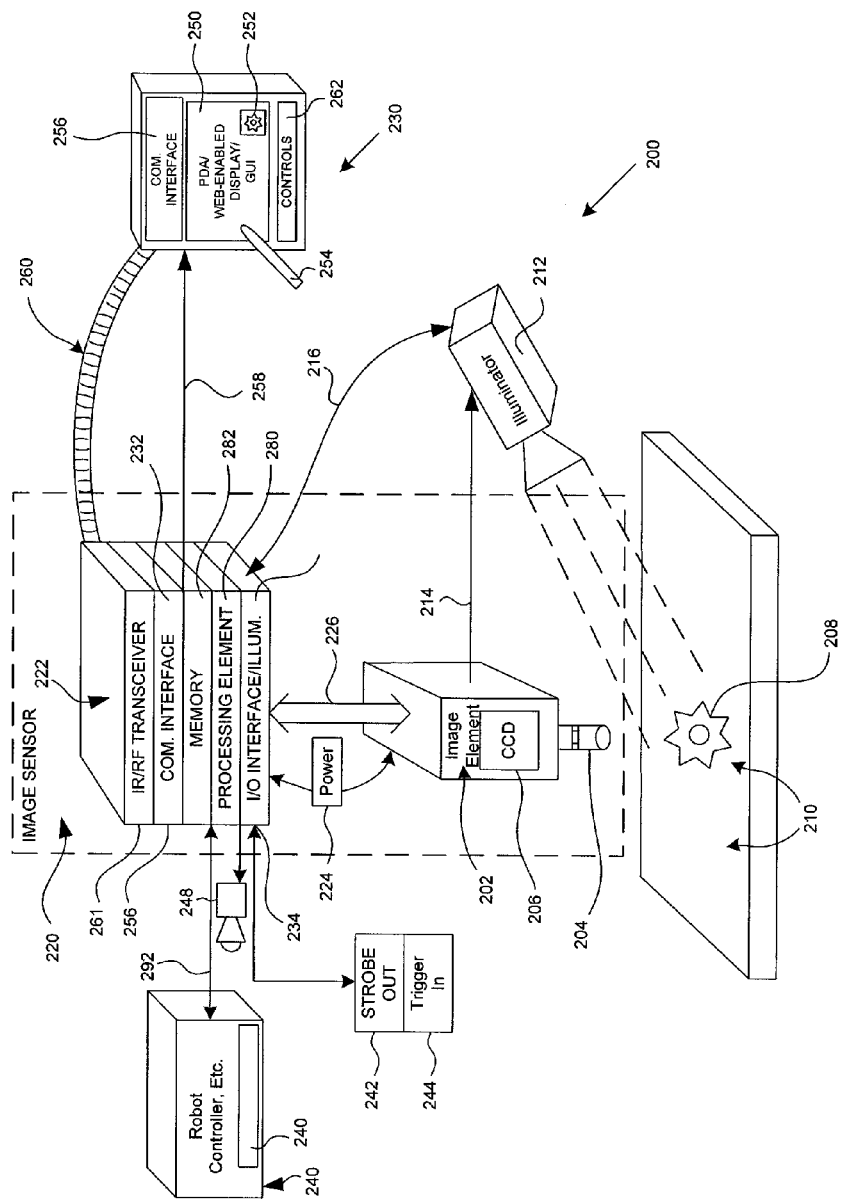
FIG. 2 is a schematic diagram of a machine vision system having a human/machine interface according to an illustrative embodiment of this invention.

FIG. 2 shows an illustrative embodiment of a machine vision system (MVS) 200 according to this invention. The MVS includes an image element 202 having a lens 204 with variable zoom and focus/aperture setting, and an electro-optical pickup (CCD) 206 for generating an of image signal of an object (the exemplary gear) 208 within the relevant field of view within the viewing area 210. A framegrabber or similar image capture device can also be included within the image element. An optional illuminator 212 for directing light at the object 208 and viewing area 210 is provided. A variety of types of illuminators (e.g. direct, indirect, backlight) can be employed. Likewise the positioning and number of illuminators is highly variable. Such illuminators can be integral with the image element 202 and powered by it as shown by the direct connection 214. Alternatively, the illuminator can be controlled and/or powered via an I/O interface via the connection 216. This interface is described further below.

As defined in this embodiment, the image sensor 220 (denoted as a dashed-line box) can comprise an overall package that resides within the work area on a suitable mounting and also includes a group of image-processing and communication interface hardware/software components 222. These components 222 are connected via an appropriate data connection 226 to the image element 202 so as to receive image data from the image element for further processing as will be described. The hardware/software components 222 and the image element 202 can be connected to a common power supply 224.

Figure 3:
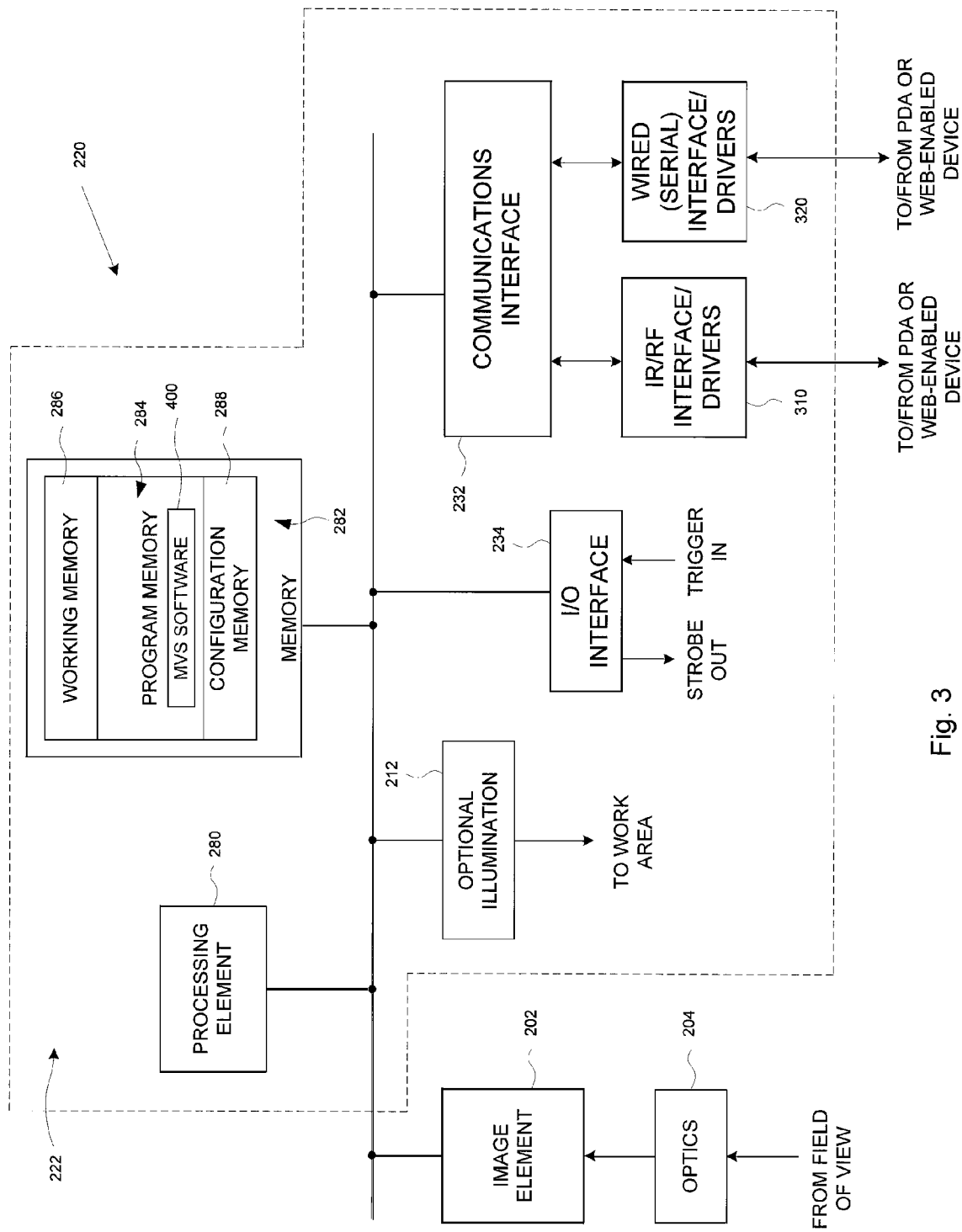
FIG. 3 is a block diagram of the machine vision sensor unit according to the illustrative embodiment.

Briefly, the sensor-end hardware/software components 222 enable processing of image data received from the image element and its associated circuitry, and provide a communication interface (232) with the users human/machine interface (HMI) device 230 as well as robot controllers, manipulators and other devices (240) requiring complex data inputs and feedback (e.g. more complex than basic "on/off" device commands, for example). Referring also to FIG. 3, the sensor-end hardware/software 222 also provides an input/output (I/O) interface 234 for transmitting strobe signals 242 (e.g. signals that cause events such as conveyor movement and shutter triggers to occur) and for receiving trigger signals 244 (e.g. signals that cause image capture). The I/O interface 234 can also control an alarm buzzer 248 or other signaling device for informing the user of a measured parameter detected outside of predetermined threshold conditions.

The HMI device 230 is a Personal Digital Assistant (PDA) or other general, web-enabled device (including a universal web-browser or similar application). The HMI device includes a display 250 capable of displaying the viewed object's image 252 at rate and a resolution sufficient to discern features of interest, and generally allow for setup (focus, contrast), training and monitoring by the user. This is described further below. The display should support a GUI that enables screen-based manipulation of information. In this example a PDA stylus is used to contact touch-sensitive portions of the screen display 250. The HMI device 230 also includes a communication interface 256 that enables a data link with the sensor-end hardware/software components 222. The interface can support a variety of conventional transmission types and formats including a cable-based serial link 258 or a wireless link 260 based upon infrared (IR) or radio frequency (RF) transmission. One possible transmission standard is the recently developed *Bluetooth*™ standard. In addition, the HMI device contains non-screen-based controls 262 for power and other basic functions that are conventional and dependent, in part, upon the make and model of HMI device.

With further reference to a PDA as an HMI device, one exemplary model is the M-100 available from Palm, Inc. of Santa Clara, Calif. This model provides a touch-sensitive monochrome display 160×160 pixels in size and supporting either four or sixteen shades of gray per pixel. The PDA contains one or more hardware elements that can provide interface to a machine vision sensor, including a serial character-oriented transceiver and IR port for two-way IR communication. Some PDAs support wireless RF interfaces such as the above-referenced Bluetooth. Others support custom parallel interfaces such as the SpringBoard™ interface by Handspring™, Inc. of Mountain View, Calif.

According to the embodiments described herein, the interface is assumed to provide a communications bandwidth as low as around 10,000 bytes/second. The PDA includes a processor typically capable of completing approximately around 4 million instructions/second (4 MIPS) with local memory of between 2 and 8 million bytes (2–8 MB)

A typical machine vision sensor, by contrast, can acquire images that are at least 512×480 pixels in size, and 256 shades of gray. Real time image transmission requires a communications bandwidth of at least 7.5 million bytes/second. Machine vision sensors typically include processors capable of at least 100 MIBS. As such prior art HMI devices have used increasingly high-resolution displays, high-speed communications, and high-performance processors to keep up with the needs of the sensor. One principal goal of the invention is to provide methods for using the much more limited PDAs so that their enormous cost and size advantages are realized.

Accordingly the invention provides an interface element on the MVS sensor that can communicate with a PDA via the PDAs integrated interface. In an illustrative embodiment, a wireless interface, such as the IR interface, is used—both for the convenience of the human operator (no physical connection need be made, and because the IR interface transmission protocol and format is a standard across most PDA vendors. The invention provides communications software elements residing on both the MVS sensor and the PDA that insure reliable bi-directional data streams, and that provide a hardware-independent interface to other software elements. However as noted above, a wired interface (serial or parallel) can be used in an alternate embodiment.

Having described generally an illustrative PDA for use as an HMI device, reference is further made to FIG. 3, which shows the sensor 220 and its interconnected hardware/software component group 222 in further detail. Notably, the hardware/software group 222 includes a processing element 280 that comprises a high-speed microprocessor having sufficient computing power to handle acquisition of images in the manner described above. One exemplary processor for use with the sensor of this embodiment is the model TMS320C6711 digital signal processor (DSP) available from Texas Instruments Incorporated of Dallas, Tex. However, a variety of processing elements can be employed. The microprocessor is adapted to handle instruction sets and perform calculations used by conventional machine vision tools, available from various vendors such as Cognex, Corporation of Natick, Mass. These machine vision tools are applications that perform specific functions, such as location of a predetermined fiducial on a viewed object, analysis of a pattern such as gear teeth, etc.

The desired machine vision tools/applications are provided to an on-board memory 282. The memory 282, can be implemented using both volatile memory devices such as a synchronous dynamic random access memory (SDRAM) for working code and data storage and nonvolatile memory devices such as a Flash memory or erasable programmable read-only memory (EPROM) for long-term storage of application information and configuration information. The memory structure is arbitrarily defined by three discrete parts. The vision tool and other application information (MVS software 400) is typically stored in the program memory 284, typically in a nonvolatile Flash or EPROM with backup that retains state information during power-off. It is contemplated that, under certain circumstances, an updated or revised program can be loaded or reloaded into the program memory 284 by accessing the appropriate write functions in the memory via the processor or another memory controller. The program or any revisions/updates can be loaded over the appropriate HMI via the communications interface 232.

A working memory 286, which is typically implemented a form of high-speed RAM, is used to store image pixel data and other data that is the subject of and/or the result of various calculations by the processing element 280. In addition, a configuration memory 288 is provided. This memory is nonvolatile and stores configuration information related to training of the machine vision application and user-adjusted parameters (for example, contrast, sensitivity, accept/reject thresholds, etc.). The configuration memory 288 is rewritten-to as directed by the user and retains current configuration information until erased or reset.

II. System Software

Figure 4:
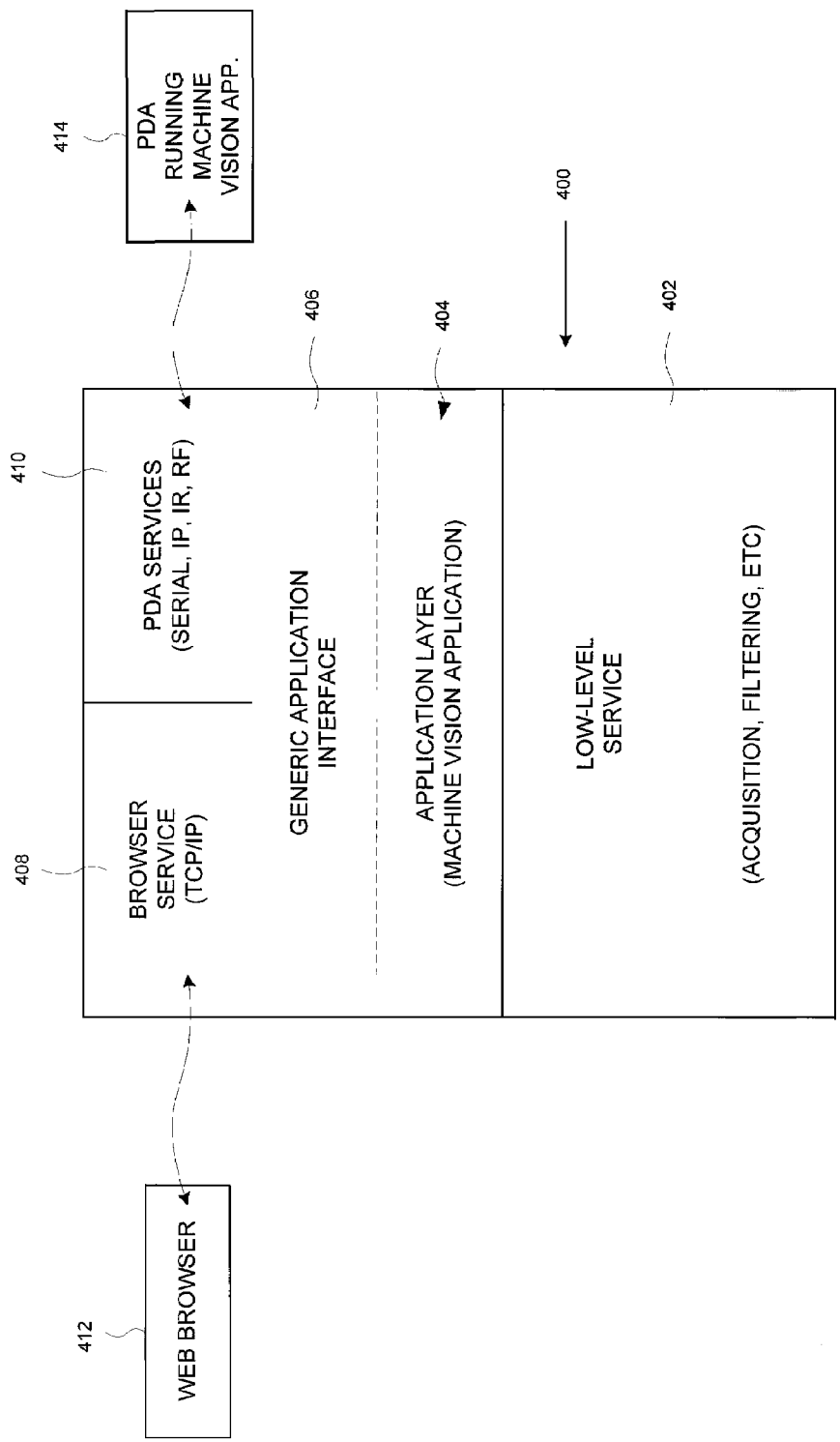
FIG. 4 is a diagram of a sensor software layer stack according to the illustrative embodiment.

The MVS software 400 used by the sensor 220 is further illustrated as a layer stack in FIG. 4. The software 400 is arranged to support the processor and communications interface 232 (refer to FIG. 3), and specifically enables data to pass over the standardized communication link (wireless via wireless adapters 310) or (wired via a serial/parallel adapters 320) between the HMI device and the sensor. In general, the stack includes low-level services 402. The low-level services layer 402 is responsible for acquisition of the image data, filtering of data and execution of machine vision application calculations via a high-level machine vision tool/application. Overlaid on the low-level services layer 402 is the application layer 404. This layer contains the machine application code that calls for specific lower-level services. This layer has inherent knowledge that it is analyzing a particular shape, such as a gear. Within the application layer 404 is a generic application interface 406. This layer allows user instruction of possible modes of operation for the underlying application (e.g. run, stop, training, etc.), and reports to the user the current mode. A set of generic functions are located in this layer 406. The top layer is divided between browser services 408 and PDA services 410. These layers 408, 410 contain software code associated with the communication interface 232.

The browser services layer 408 is, in essence, a Hypertext Markup Language (HTML) server that generates HTML based upon information carried in the generic application interface layer 406. It creates HTML-formatted buttons, windows, text and image data for transmission to an interconnected, generic web browser 412. Specifically, the communications interface formats the HTML information into packets (for TCP/IP links, for example) or another appropriate communication protocol for transmission over the link. Likewise, received packets from the browser are converted to HTML information, which is, in turn, converted by the browser services layer 408 to information usable by the generic application interface layer 406. In general where a generic browser HMI is employed, the information and image data passed from the sensor to the HMI is converted into a web-browser-compatible form. There may be appropriate reformatting and compression of the original image data to facilitate ease of handling by the browser and transmission.

The PDA services layer 410 is a PDA-specific code set that supports the chosen PDA-based HMI device 414. Information sent to and received from the application interface layer 406 is formatted so that it comports with the format already established in the subject PDA. In other words, a machine vision application is typically resident on the PDA and allows creation of a specific set of GUI display screens and buttons that are related to the machine vision application resident in the sensor. By providing an machine vision application on the PDA, less PDA application support data must travel over the link, thereby better balancing the processing workload between the sensor and PDA and allowing more image data to travel over the link.

The data transferred via the PDA services layer 410 via the wired or wireless link is formatted so as to relate to predetermined screens and buttons. Some exemplary screens and buttons are described further below. The implementation of code for transmitting information between a PDA and target device should be well-known to those of skill in the art. A particular implementation of such code can be made in accordance with the C++ programming language-based development environment for creating Palm operating system applications, sold as *CodeWarrior for Palm OS® Version* 6.0–8.0 available from Metrowerks, Inc. of Austin, Tex. Reference is also made to the text, *Inside CodeWarrior®* by Metrowerks, Inc., Austin Tex. (1999).

Figure 5:
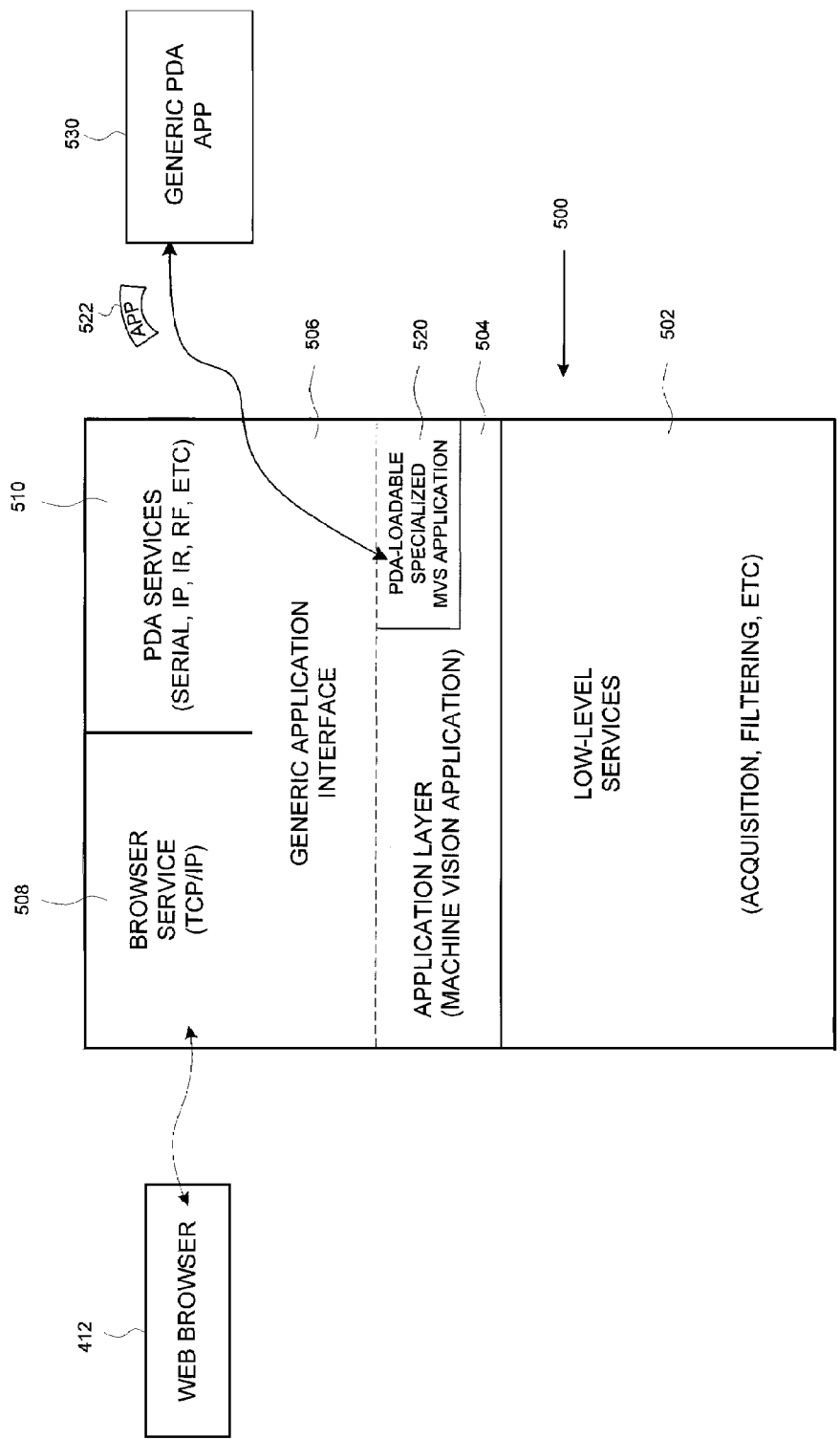
FIG. 5 is a diagram of a sensor software layer stack according to an alternate embodiment of this invention.

As shown in FIG. 5, the MVS software stack 500 includes a low-level services layer 502, application layer 504, generic application interface 506, browser services layer 508 and PDA services layer 510, generally similar in function and structure to those described for the stack 400 in FIG. 4. However, according to this alternate embodiment, the application layer 504 includes a stored PDA-loadable specialized machine vision application 520. This is an application adapted to be loaded over the communication link (application transfer 522) based upon an appropriate call from the PDA running a "generic" machine vision application 530. The generic application contains standard interface, caching and other generic functions that are common to all MVS applications that are likely to be encountered. The generic application allows the loading and storage of the specialized application 520 that supports the GUI screens, buttons and other information needed to build the specific MVS sensor's HMI. The division between generic and specialized applications is, of course, highly variable, and depends in part upon the degree of standardization of screens, buttons and associated data (i.e. the more standardized, the more that can reside on the generic application). It may also depend upon the amount of storage available on the PDA. One advantage to this approach is that an updated application on a newer sensor is automatically provided to the PDA.

Where a specialized application is loaded, it may be necessary to flush any prior stored or cached specialized applications from the present sensor or a different sensor. The generic application can include a handshaking process for identifying similar versions of a specialized application so as to avoid unnecessary reloading of the specialized application where it already exists.

While, it is expressly contemplated that a PDA can support a generic web browser in an alternate embodiment, limitations in storage space and speed may favor the use of a purpose-built machine vision application resident on the PDA, including such generic applications as described above.

III. Image Compression and Reformatting

Figure 6:
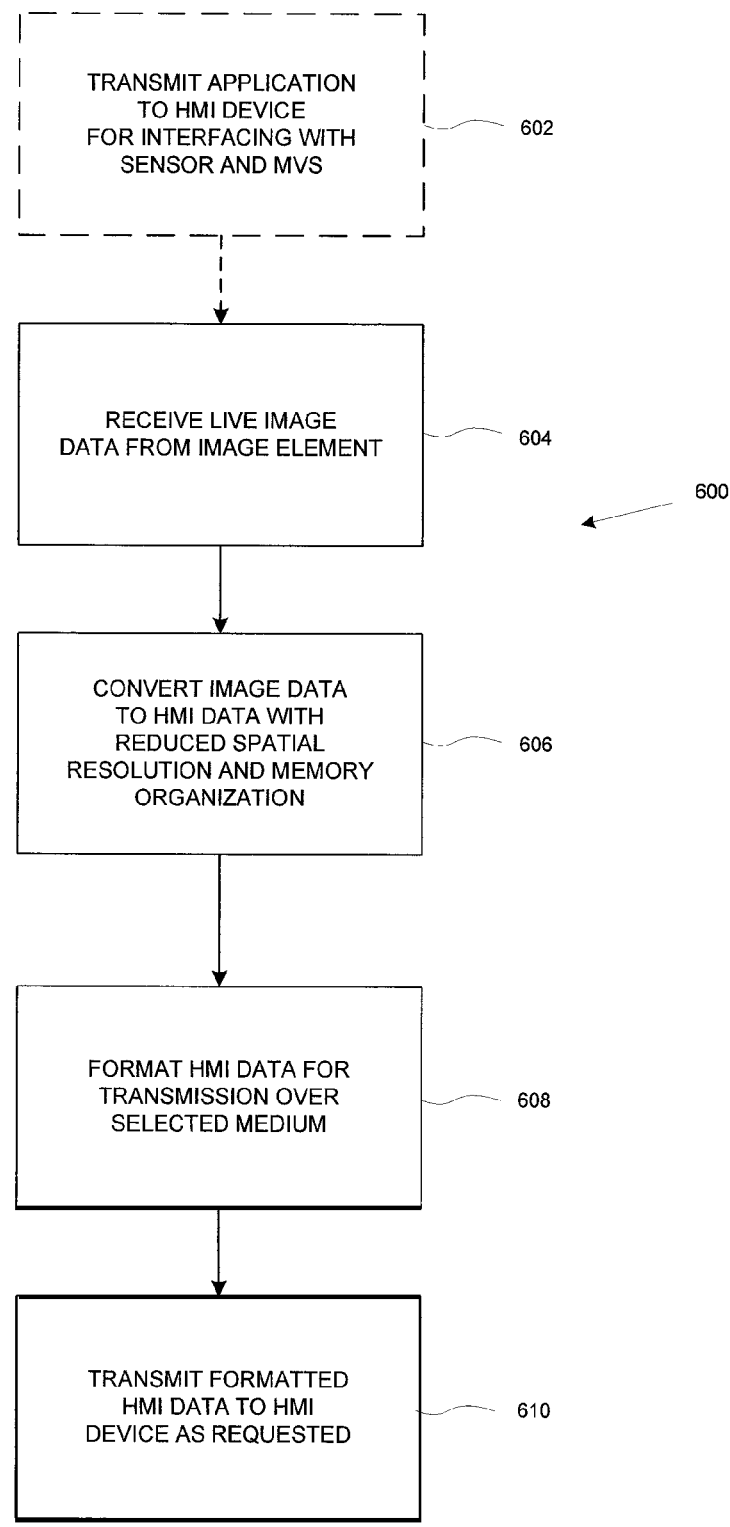
FIG. 6 is a flow diagram showing a generalized procedure for converting machine vision system data into data for receipt and use by a predetermined human/machine interface device.

As discussed above, there are significant limitations on the relative communication and display speed and display detail available with a PDA. In general, the transmission of instructions and information from the PDA to a sensor does not typically overwhelm the PDA's capabilities. However, the return of certain MVS data—particularly image data—must be made at a data rate and reduced format that conform with the reduced capabilities of the PDA and communication link. Accordingly, FIG. 6 details a generalized flow diagram 600 showing a data conversion and transmission procedure occurring within the sensor. According to optional step 602 (shown in phantom), the first step may be the loading of the desired machine vision HMI application into the PDA, assuming it has not already been provided or preloaded. In this example, a version of the required PDA machine vision program is stored in the sensor's program memory 284 (or another dedicated memory), and is transferred into the PDA when requested by the PDA via the PDA services layer. This can be in conjunction with a generic PDA application as discussed above (refer to FIG. 5) or based upon another technique. For, example, according to one embodiment, the program can be loaded into a Palm PDA by using a Palm HotSync® function, as described in literature available from Palm, Inc. In this example the PDA services layer is programmed to recognize a HotSync request from the PDA and load the PDA program from the sensor so as to synchronize the PDAs data with that of the sensor.

Having loaded the appropriate machine vision program in the PDA for the selected sensor, the communication between the sensor and PDA can proceed. Typically, a connection request in made by the PDA, and the link (wired or wireless) is established with the sensor. When image data is requested by the PDA, the image data is first received by the processor in conventional MVS format (typically 8-bit pixels arrayed 640×480 pixels) from the image element (step 604). The sample rate for data is chosen to comport with the transmission bandwidth available as well as the speed at which the PDA can accept the data. In one example, image data can be transmitted at approximately two frames per second where data compression is used. The specific frame rate is dependent in large part upon the type and degree of data compression employed. A conversion process (step 606) reduces the spatial resolution (to 160×120 pixels) and the grayscale level is reduced (to 2 or 4-bit pixels). Similarly, the memory organization is altered so that it comports with the format preferred by a PDA. Next, the requested image data is formatted for transmission over the selected wired or wireless medium (step 608). This may entail packetizing of the data or otherwise streaming it according to a standard format. The image data is then transmitted over the chosen link to the PDA for receipt by its interface (step 610).

Referring to step 606, a variety of techniques can be employed for converting image data from an MVS format to a format acceptable in a PDA. According to an illustrative embodiment, the application software (400), running on the processing element, can include any of a number of commercially available image compression routines that are adapted to reduce the prevailing MVS pixel gray level value (8-bit) to 2 or 4-bit values, and to provide a resized format from the MVS range (640×480 pixels) to the PDA display range of 160×120 pixels. The power and processing speed of the sensor's processing element and memory is sufficiently high to enable advanced, calculation-intensive image compression and reformatting to occur in real time. A basic compression technique involves the transmission of a fixed gray-level value and range for a portion of the display having (after reducing gray level differences) approximately the same intensity value. This reduces the overall data stream, thus reducing taxation of the PDA processor and transmission line. Likewise, the sample rate of transmitted images can be slowed from a normal MVS frame rate. In one embodiment, a transmission rate of two images per second is used. It is also possible to use the compression routine to enhance the detail of the image for the PDA by using an advanced statistical algorithm to convert MVS image data to the appropriate gray level and format based upon weight factors that may favor certain characteristics of the reduced-power display of a PDA. For example, if the screen of the PDA is less capable of discerning low-intensity features, there may be higher contrasts provided along low-intensity feature boundaries, while higher intensity areas may be less differentiated.

According to one generalized embodiment, the MVS processor converts a 640×480, 8-bit pixel source image to a 160×120-pixel, 2 or 4-bit display image by selecting every fourth pixel horizontally and vertically (a process known as sub-sampling), and then selecting the high-order 2 or 4 bits of each pixel In another embodiment, the source image is processed by a suitable low-pass filter before sub-sampling. In another embodiment, a selectable, non-integer digital re-sampling method is used to provide display images of any desired magnification and in any desired portion of the field of view (e.g. selectable pan and zoom). In another embodiment, the intensity distribution of the source image is analyzed by the MVS, which then compresses the intensity range from 8 bits to 2 or 4 bits so that the display gray levels cover the actual range of intensity in the source image. This can be accomplished, for example using intensity histogram analysis of the image data.

In one illustrative embodiment, digital re-sampling is combined with intensity compression to maximize the display capabilities of the PDA without taxing its limited processor.

In another illustrative embodiment, the display image is formatted by the MVS to match the hardware display requirements of the PDA so that its processor can execute the display with minimal intervention.

In yet another illustrative embodiment, the display image is compressed by a simple algorithm to reduce transmission time. Although many sophisticated image compression methods are well-known in the art, the it is possible to provide a simpler compression method that generates a transmitted, compressed data stream more suitable for the limited processor speed and memory size of the PDA.

Note that the reduced-resolution, compressed display image generated by the MVS can be transmitted quickly enough to allow a refresh rate that is tolerable for some purposes, but is still substantially less-quickly refreshed than a conventional real time MVS display. For example, live image display can be employed for camera mounting during MVS installation (for setting contrast, zoom and field of view, for example), but aperture setting, and particularly focus, may require use of a specialized technique to attain the desired level of detail for accurate focus and aperture adjustment. In particular, the display quality of the 2 or 4-bit PDA image may prove insufficient for proper focus and aperture setting. Additionally, current implementations of machine vision sensors rarely employ auto-focus or auto-iris lenses due to their significant added cost to the overall MVS.

Figure 7:
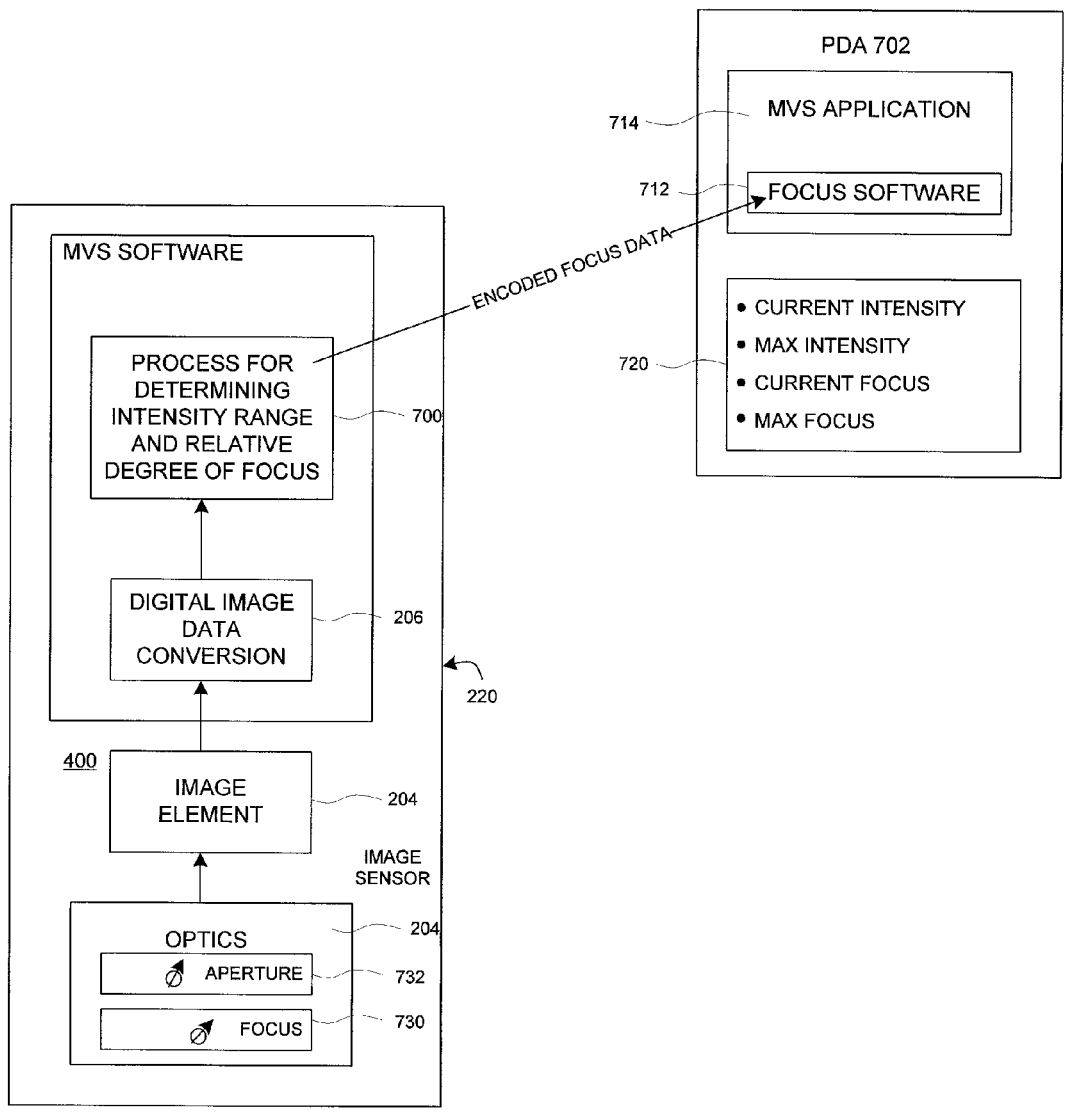
FIG. 7 is a block diagram of a specialized mechanism for enabling focus and aperture adjustment using a limited-display-capability human/machine interface device, such as a PDA.

Accordingly, reference is made to FIG. 7, which shows a specialized encoding mechanism 700 in the MVS software 400 of the image sensor 220 to enable precise manual focus and aperture setting using a PDA 702 for HMI, notwithstanding the PDA's typically slow and lower-quality image display. The mechanism 700 includes software processes running on the MVS that analyze acquired images from the digital image data 706 in real time to determine intensity distribution range and relative degree of focus. These results are encoded in a relatively small number of bytes of data 710, and transmitted to the PDA in real time. The PDA contains software processes 712 within its resident MVS application 714 that display the current and maximum range of intensity (for aperture adjustment) and the current and maximum degree of focus 720. Based upon the returned data displayed to the user, optical focus 730 and optical aperture 732 can be adjusted until the desired readings are displayed to the user. Note that focus and other data can be displayed as a function of time for further aiding adjustment decisions.

Note that the determination of the intensity distribution of the image data by the sensor enables transmission of that intensity distribution information with respect to the determined intensity distribution. The HMI includes a process for displaying, based upon the information, a visual representation of the intensity distribution. This particularly assists the user in adjusting lighting intensity, shutter exposure time, lens aperture, and other parameters affecting the intensity distribution in the image data.

According to one illustrative embodiment, software processes running on the machine vision image sensor are employed to allow an object to be described by certain characteristics that can be encoded in far fewer data bytes than the original acquired image, and can be displayed effectively in far fewer levels of gray. This embodiment provides corresponding software processes running on the PDA device that can receive such encoded object descriptions and display them for monitoring, training, and other purposes.

In an illustrative embodiment, object boundaries are extracted from a source image using well-known procedures, and converted to into an encoded list of point. Such a list is not only rather compact, but can be displayed using only two shades of gray—black and white. Object boundaries so encoded can be transmitted and displayed by the PDA relatively efficiently. In one alternate embodiment, the list of points is encoded in polar coordinates, for convenience and efficiency in describing and displaying round objects. In another illustrative embodiment, each point of the encoded list is augmented by a numerical rating, score, or other indication of some quantity, quality, or characteristic determined by machine vision analysis. The augmented lists are transmitted to the PDA and displayed using multiple shades of gray, varying styles of lines, or other means to show the machine vision results to a user.

Note, while the foregoing and other image processing techniques are applicable mainly to an embodiment that employs a PDA as the HMI device, it is expressly contemplated that some or all of these techniques can be applied to a web-browser enabled device to reduce taxation of transmission bandwidth and speed the update of displayed web page images.

IV. Exemplary GUI Screen Displays

According to an illustrative embodiment, a general-purpose GUI for either a web-enabled HMI device (for example a laptop PC) or a PDA is used for configuration and control of the MVS. Such GUI elements include menus, buttons, checkboxes, dropdown lists, alphanumeric parameter entry, and ocher well-known GUI elements. General-purpose GUI elements also support installation, training, and monitoring, although these operations also rely on specialized GUI elements below. The invention provides for the use of the image display processes described above to generate a display for object training. Specialized GUI elements running on the PDA allow a user to select points, lines, and rectangles, and perform other operations as needed for training, directly on the display image using the PDA's stylus or like input device. Specialized software elements running on the PDA also allow the display image to pan and zoom as necessary for accurate selection and other necessary operations.

Figure 8:
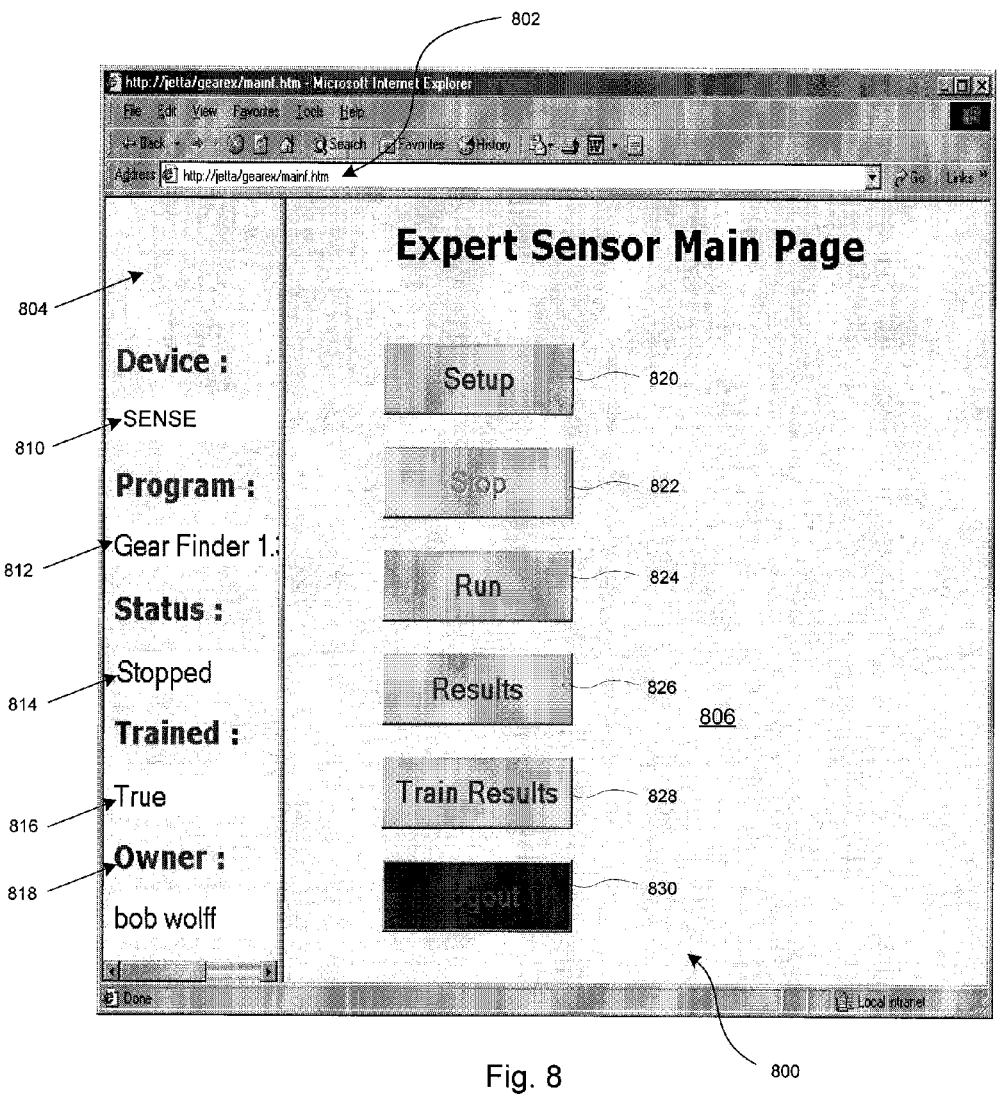
FIGS. 8–12 are each plan views of exemplary graphical user interface display screens for a web-enabled device configured as a human/machine interface device showing a Main, Setup, Live Image, Shape Profile and Statistics page, respectively.

FIGS. 8–12 show a generalized screen display for a web-enabled HMI device according to an embodiment of this invention. FIG. 8 shows a Main page 800 for the device display. This page, and other HMI device pages herein, are encoded as HTML objects according to this embodiment. However, it is expressly contemplated that other browser scripts and languages can be used according to alternate embodiments. They are accessed from browser services (408 in FIG. 4) in the software stack running on the sensor 220. A Uniform Resource Locator (URL) address window 802 identifies the appropriate URL-based address for the desired page. The format and buttons specified for the page are stored within the MVS software. Thus, a conventional web browser application on the HMI device, such as Microsoft's Internet Explorer®, can be used. The illustrated Main page 800 relates to an exemplary gear analysis vision application. However, the principles shown and described herein can be applied variously to other trainable machine vision applications.

The Main page 800 is divided into a left-hand status window 804 and a main control button/working window 806. The status window, in this example, shows the connected sensor device (named "Sense"), which is also the address or network identifier for the particular MVS. The particular machine vision tool or application is denoted in the Program window 812. The current operating status of the system (stopped, training, running, etc.) is, likewise, shown in the Status window 814. The particular training status is shown in the appropriate Trained window 816. Other relevant information can be included in further windows such as the system Owner window 818.

Within the button window 806 of the Main page 800 is provided a series of choices for the user including Setup 820 button which accesses a Setup menu and a Stop button 822, which stops the runtime operation of the MVS and its associated applications/tools. Likewise, a Run button 824 is provided to initiate MVS runtime operation. Sensor results can be reviewed by pressing the Results button 826. Training results can be viewed with the associated Train Results button 828 and a Logout button 830 is used to break contact with the sensor. The Logout is usually engaged after run has been initiated, or the sensor is been shut down.

Figure 9:
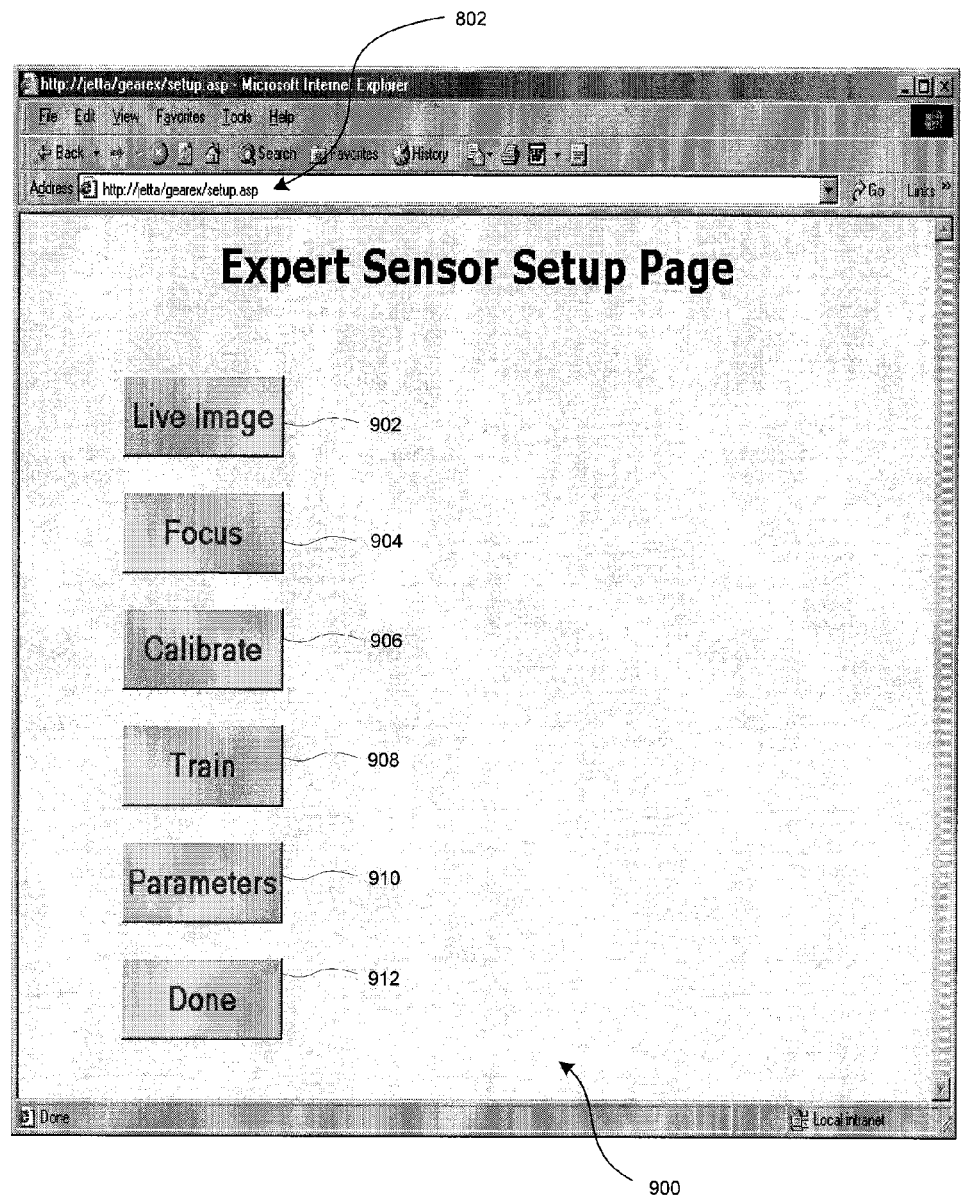

FIG. 9 shows a Setup page 900 that is accessed by activating the Setup button 820 in the Main page 800. Setup allows the user to set certain characteristics and parameters for the machine vision sensor and to monitor live images. Much of the setup information is typically stored within the configuration memory 288, described above. Within the Setup page 900 are buttons for viewing a Live Image 902; engaging in a Focus procedure 904; a Calibrate procedure 906 and a Train procedure 908. A Parameters button 910 allows the prevailing parameters within the overall configuration to be displayed and edited. A Done button 912 allows return to the Main page 800.

Figure 10:
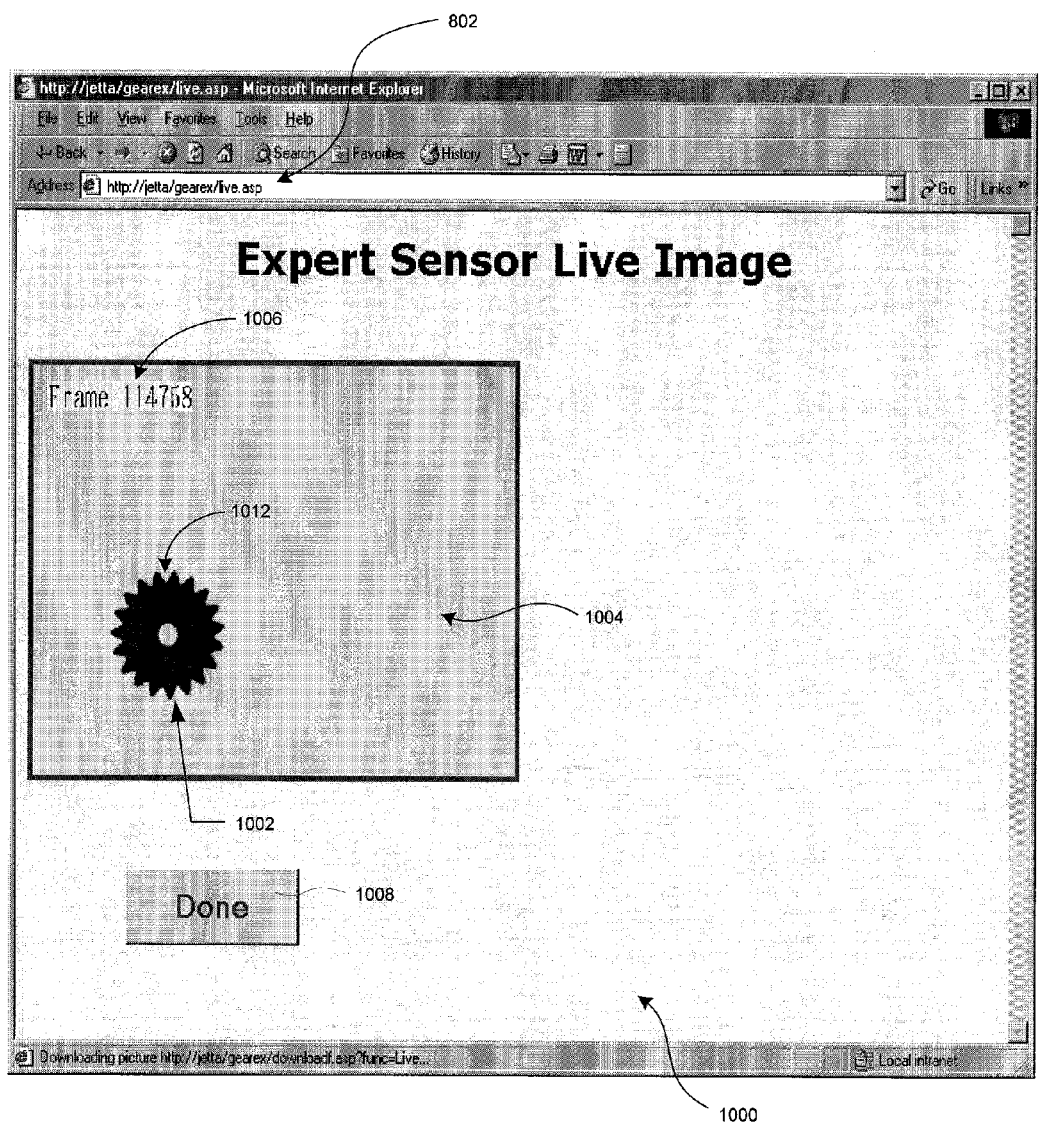
Figure 11:
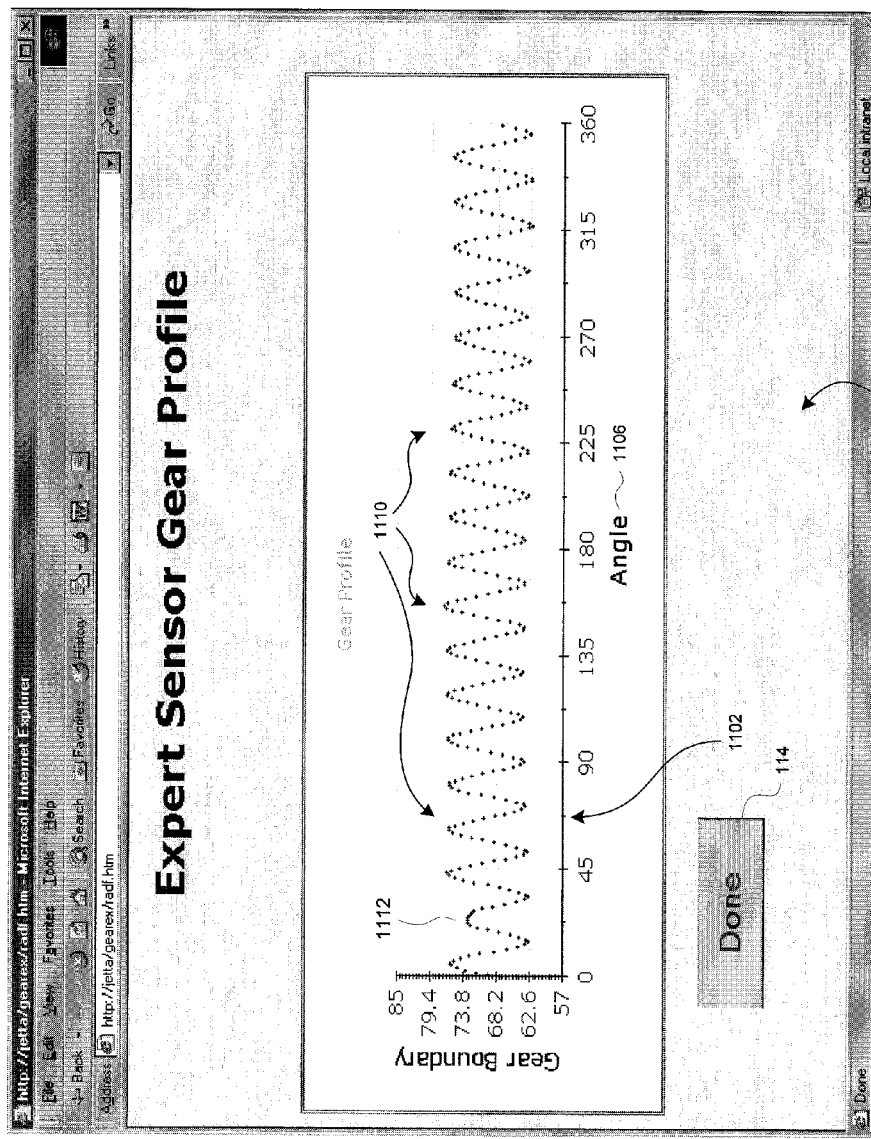

By activating the Live Image button 902, a live image screen 1000 is displayed, as shown in the example of FIG. 10. The exemplary live image 1002 (a gear) is projected within a display box 1004 and the relevant viewing frame number 1006 is shown. The refresh rate and characteristics of the live image are determined by the compression algorithm as described above. Each screen image refresh is denoted by a particular frame number. When viewing is complete, the viewer can return to the Main page or Setup page by activating the Done button 1008.

By activating an appropriate button or designating the appropriate address, a graphical profile for the image 1002 can be displayed in the profile display 1100. The profile display in this example defines graph 1102 of the viewed gear's tooth boundary 1104 versus rotational angle 1106. As can be discerned from the graph, the machine vision tool in this example includes specialized routines for identifying circular gear teeth, and calculating and displaying the particular information relevant to circular gear teeth. The resulting sinusoidal curve 1110 represents the shape of the gear teeth and their interspersed valleys. An out-of-tolerance tooth 1012 (see FIG. 10) is referenced by a shortened curve peak 1112 on the graph curve 1110. As in other displays, a Done button 1008 is provided for return for return to a previous screen. Note that other machine vision tools may, for example, be specifically adapted to recognize screw threads or integrated circuit pin connectors. The relevant information for such shapes (e.g. thread pitch, pin spacing and width, etc.) would then be displayed by the software.

Figure 12:
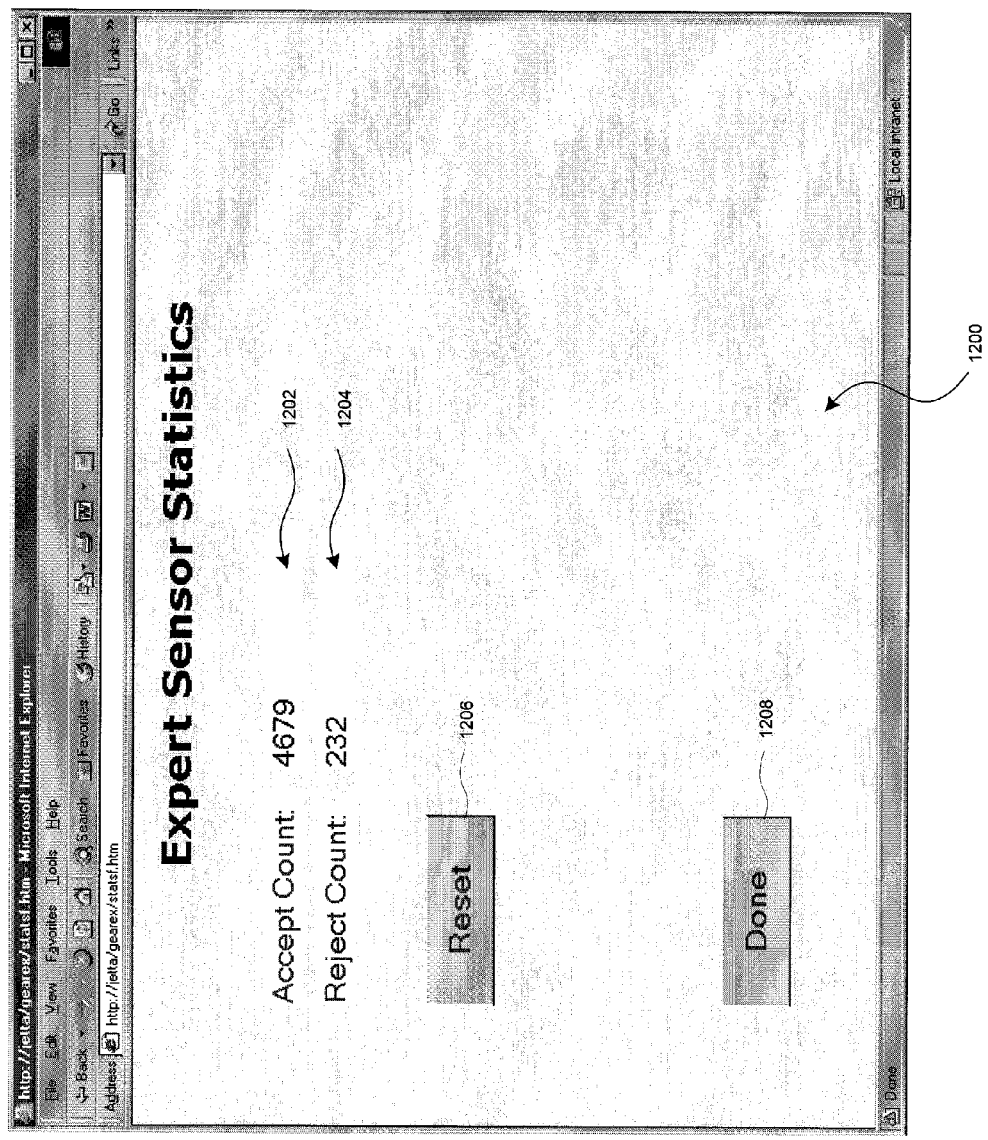

As shown in FIG. 12, a runtime Statistics page 1200 can be provided. This can accessed through the Results button 826 or a related page. This page describes the number of viewed images (gears) within parameters (Accept Count) 1202 and those that were outside of parameters (Reject Count) 1204. This running count can be reset by activating the Reset button 1206. There is an appropriate Done button 1208.

A variety of other pages are also provided to the web-based HMI device GUI, including those that access training procedures, focus procedures and other significant machine vision system functions. Certain pages can be tailored to the particular machine vision tool or application, and other pages are general to most machine vision applications (such as focus, training, and the like). Some additional types of pages are described with reference to FIGS. 13–19—which show an exemplary display for a common PDA according to an illustrative embodiment of this invention.

An exemplary PDA 1300 used as an HMI device according to an illustrative embodiment of this invention is shown in FIGS. 13–19. Generally, the PDA includes a touch-sensitive display screen 1302 having a GUI window 1304 for displaying various information, graphics, and for interacting with application-generated buttons. The display screen 1302 also includes a keyboard and/or other interface display region 1306. This region 1306 resides in a generalized control area 1308 that also includes a set of electromechanical control buttons 1310 for activating a variety of basic functions including power on/off and menu scroll. The display screen 1302 is activated by use of a stylus (254 in FIG. 2), or another similar device. The stylus interacts with sensitized areas of the display screen 1302 within the bounds of buttons that are generated by the PDA operating system and associated applications. The functions specified by the respective buttons can be activated in a variety of ways. For example, some buttons may be activated immediately upon touch by the stylus. Other buttons may require a touch and release to activate.

Figure 13:
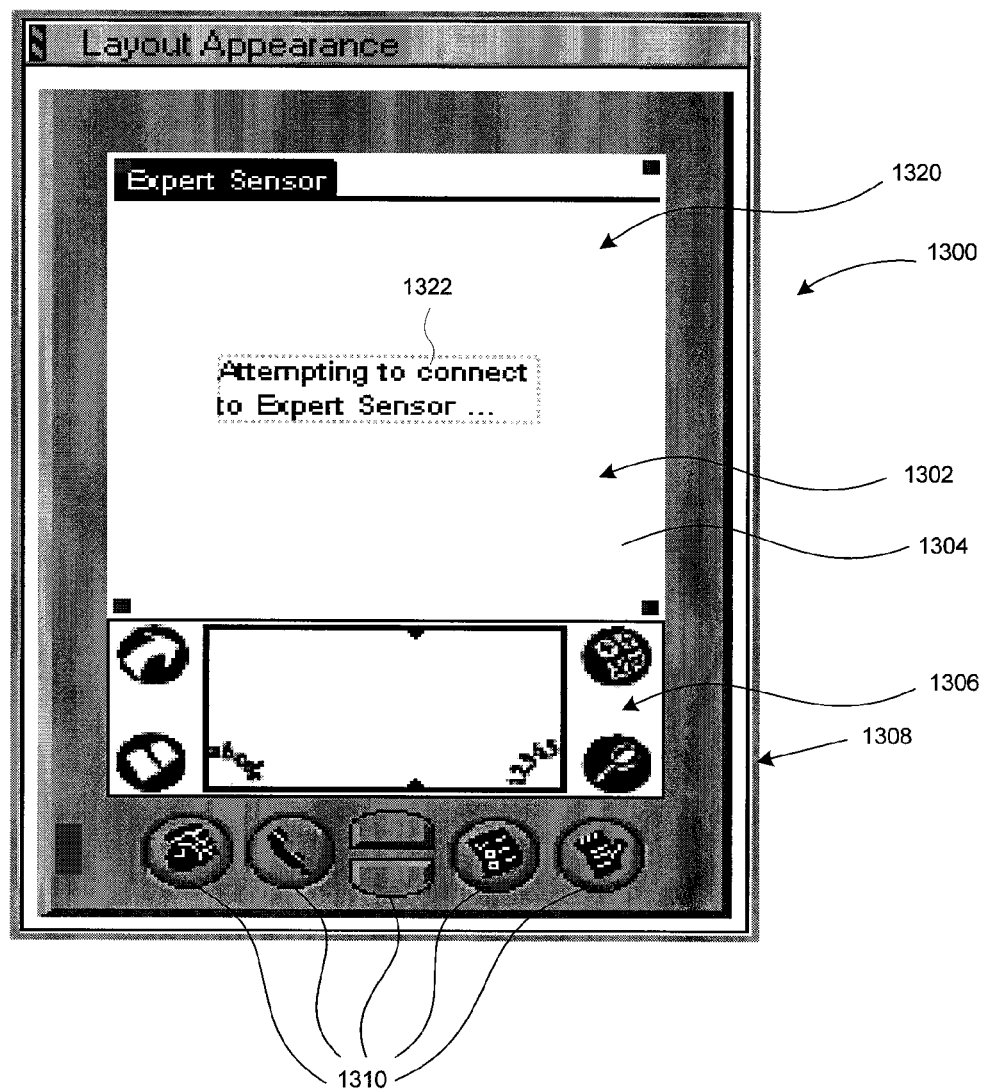
FIGS. 13–19 are each plan views of exemplary graphical user interface display screens for a Personal Digital Assistant configured as a human/machine interface device showing a Connection, Main, Setup, Live Display, Focus; Train Results and Results screen, respectively.

With particular reference to FIG. 13, the GUI portion 1304 of the PDA display screen 1302 provides a Connections screen 1320. The Connections screen is the typically first screen to appear upon startup of the MVS software. The Connections screen 1320 includes a connection status window 1322 indicating an attempted connection to the MVS (entitled "Expert Sensor" in this example).

Figure 14:
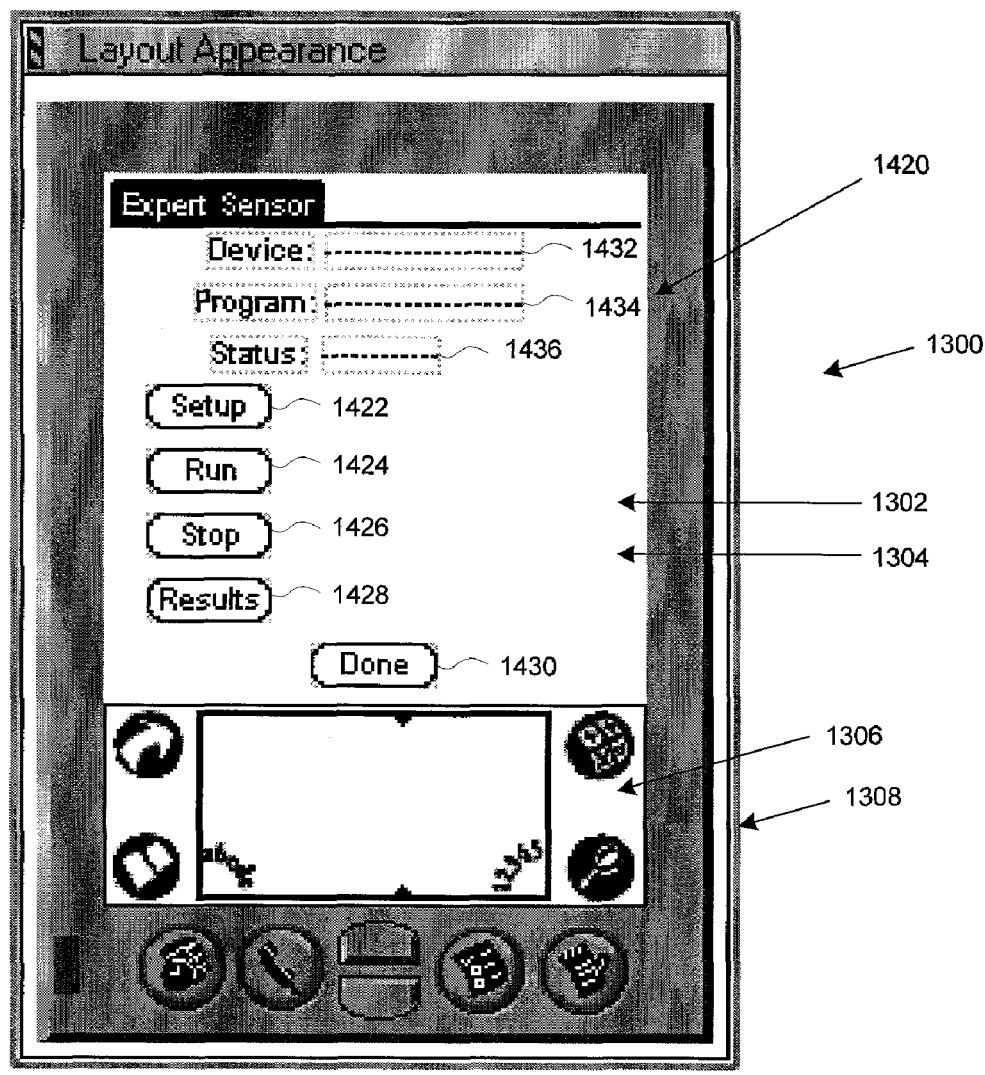

As shown in FIG. 14, once a connection is established via a wireless link or cable, the GUI portion 1304 of the display screen 1302 displays a Main screen 1420. The Main screen includes standard buttons, including Setup 1422, Run 1424, Stop 1426 and Results 1428. In addition, the often-described Done button 1430 is provided. Data regarding the connected device is shown in appropriate Device window 1432. The associated application is shown in a Program window 1434 and the current status (run, stopped, training, etc.) is shown in a Status window 1436.

Figure 15:
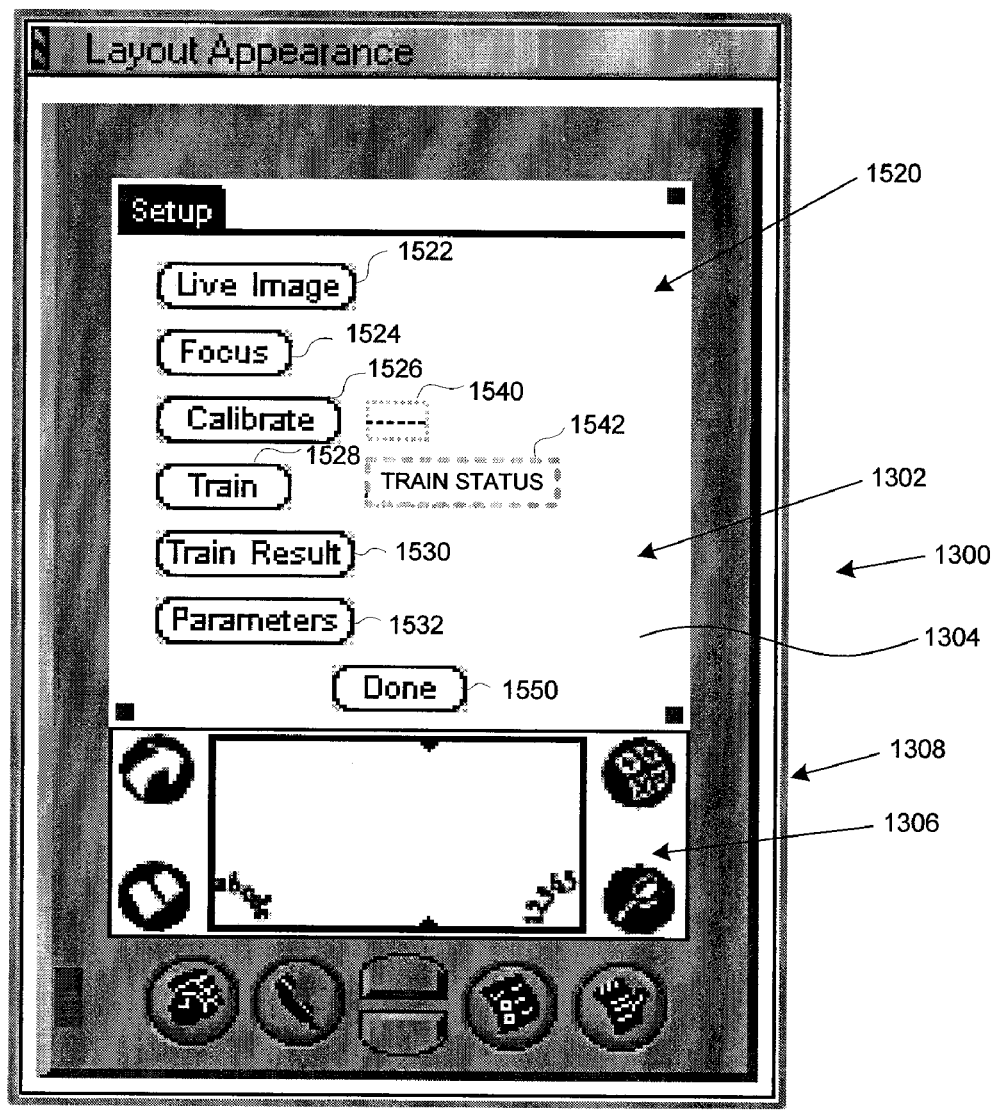

With reference to FIG. 15, activating the setup button 1422 (FIG. 14) generates the Setup screen 1520. This screen, like the above-described web browser, contains buttons for Live Image 1522, Focus 1524, Calibrate 1526, Train 1528, Train Result 1530 and 1532, that each access one or more respective screens. The Calibrate button also shows a calibration value in an adjoining window 1540. Likewise, the Train Status is shown in a window 1542 aside the Train button 1528. Some exemplary Train Status values are "Trained OK," "Not Trained" or "Trained Failed" depending upon the current training state and/or outcome of a previous training procedure. Of course, a Done button 1550 is also provided.

Figure 16:
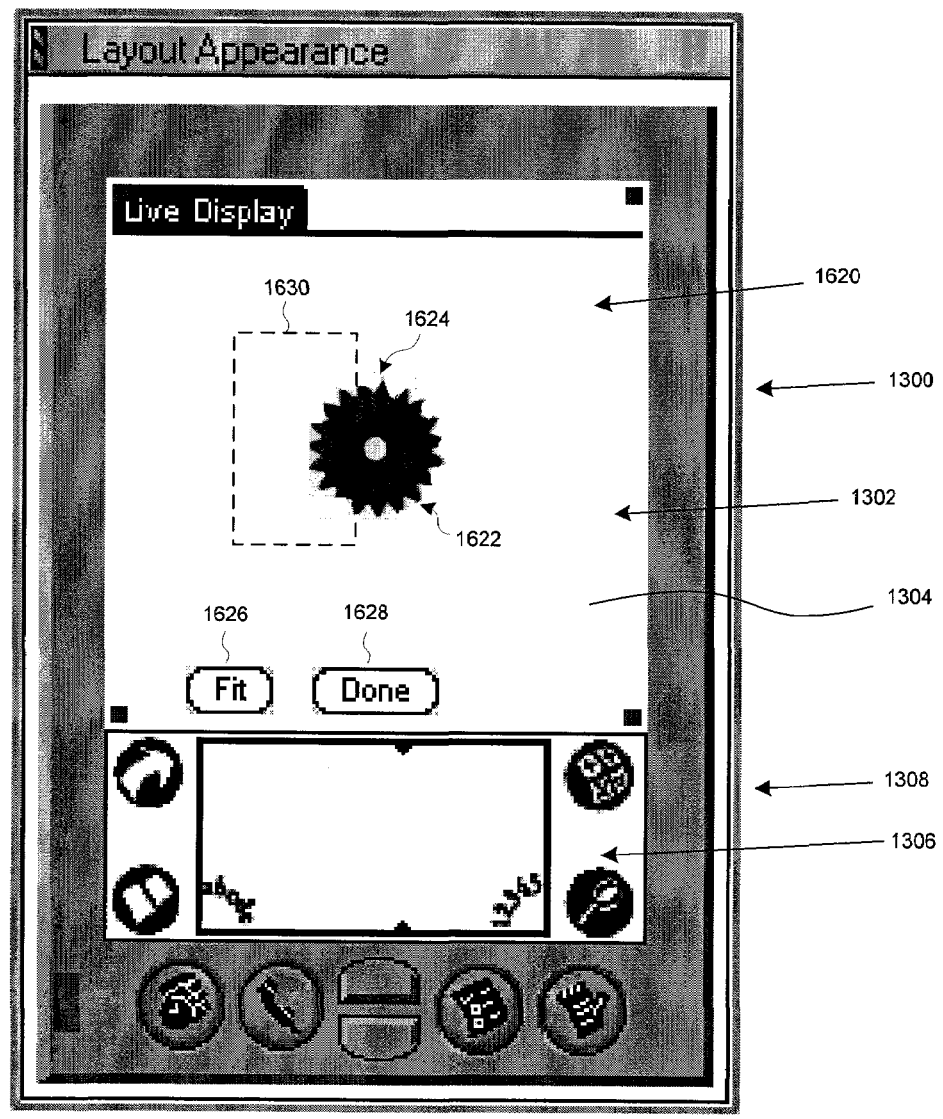

Referring now to FIG. 16, a Live Display window 1620 is shown. It is accessed via the Live Image button 1522 on the Setup screen (FIG. 15). The Live Display screen 1620, in this example, shows a gear image 1622 in real time. Note that this gear has the previously described out-of-tolerance tooth 1524. A Fit button 1526 allows the size of the viewed gear to be adjusted to fill the screen display, thus allowing for the best resolution of the area of interest. Of course, a Done button 1528 is also provided.

Notably, a zoom window (dashed line 1630) can be defined on the Live Image screen 1620 using the stylus around a portion of the gear image 1622. By entering the appropriate series of stylus strokes, or other menu commands, the portion of the image within the blocked window 1630 can be further magnified to fit the screen display. In this manner, the user may view a specific area of interest in greater detail. The magnification can occur within the image data already resident on the PDA. However, this tends to further degrade the image quality on the zoomed area. Preferably, an instruction is sent by the PDA application to the sensor to transmit zoomed-in data on the selected (boxed) portion of the acquired image. The zoomed-in data is formatted to the PDA's standard pixel range (120×160). An advantage to feeding only zoomed-in data is that the overall data passing over the link remains unchanged (thus not further taxing communications or the PDA processor/memory), but the image resolution is increased proportionally to the zoom.

Figure 17:
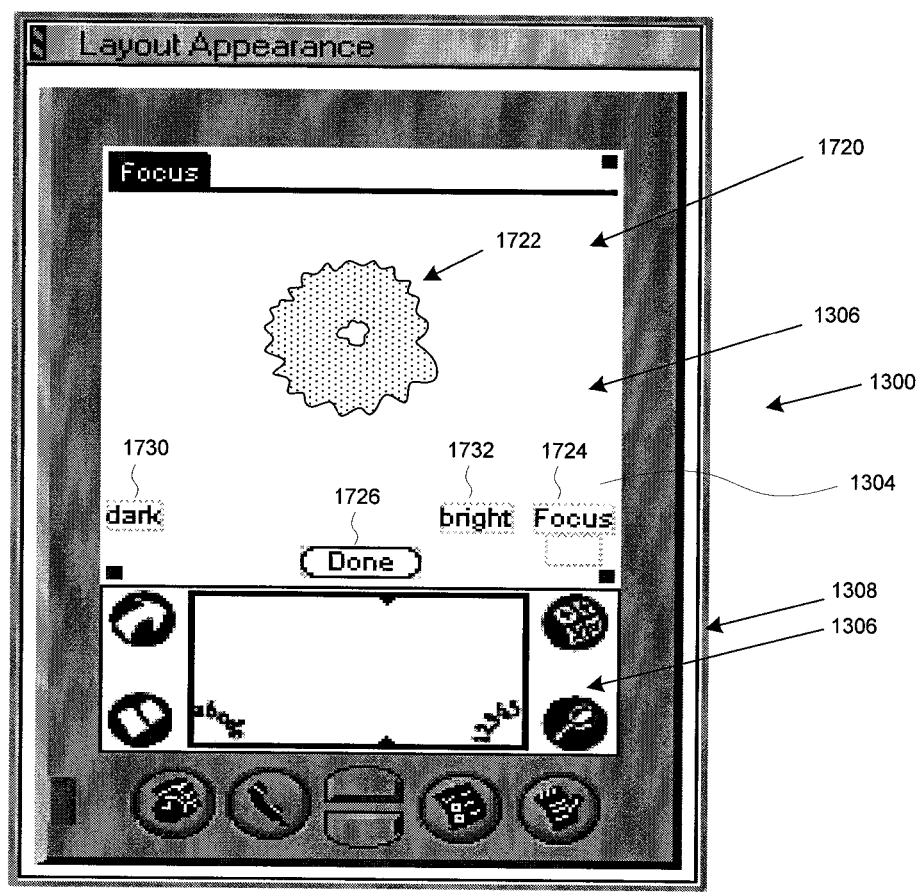

Referring to FIG. 17, a Focus and contrast adjustment screen 1720 is shown. A (somewhat out-of-focus) image 1722 is displayed. A focus image is obtained by activating the focus button 1524 on the Setup screen 1520 (FIG. 15). As described above, this image is specially formatted to enable a high-resolution focus procedure. The user typically focuses on the object by manually by moving the focus ring on the lens of the image sensor until the viewed image on the screen 1720 appears to be sufficiently crisp and clear. In some embodiments focusing can also be accomplished remotely by actuating a powered focus ring. When the proper focus is attained, the Done button 1626 can be actuated.

In addition, the Focus screen 1720 provides dark and bright contrast buttons 1630 and 1632, respectively. The contrast buttons are used to control the viewed contrast between the object and its background. Note that contrast is also be varied by changing the direction and intensity of illumination. The illumination level can be adjusted while the Focus screen 1720 is viewed. Alternatively, illumination can be adjusted using the slower-refreshing Live Display screen 1620 (FIG. 16).

Figure 18:
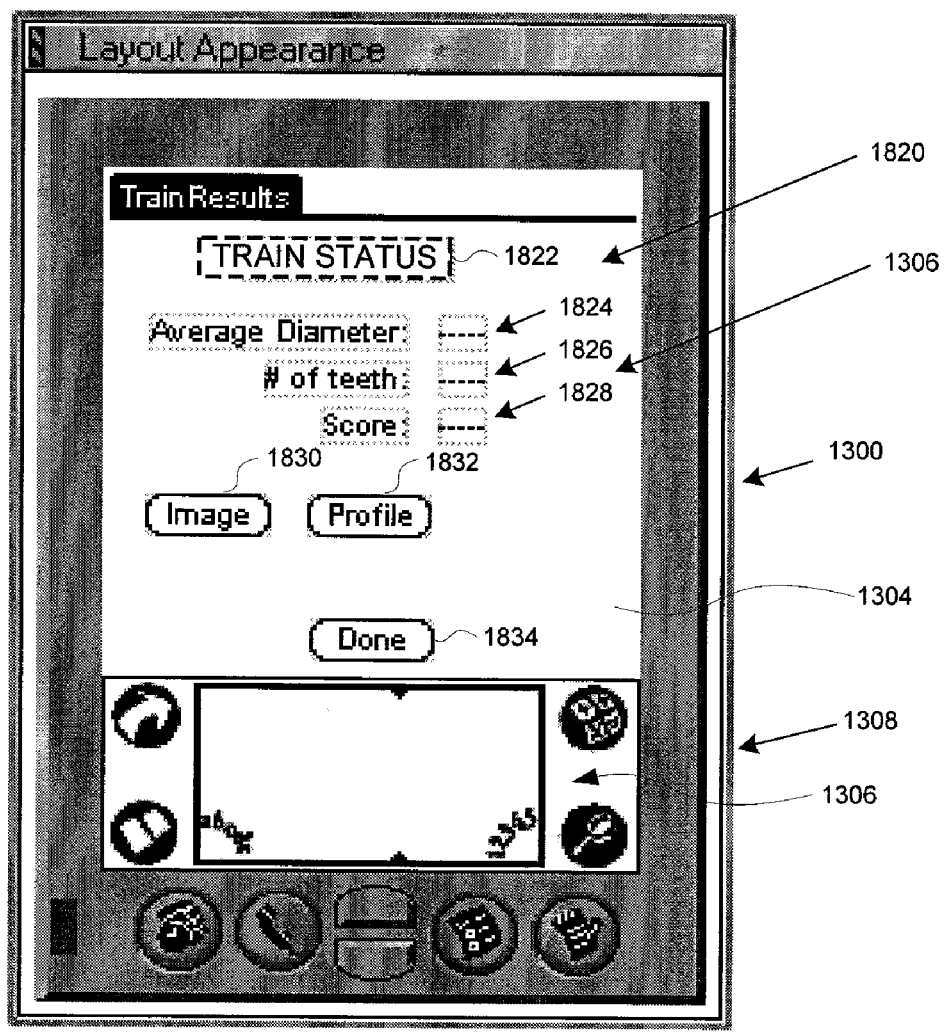
Figure 19:
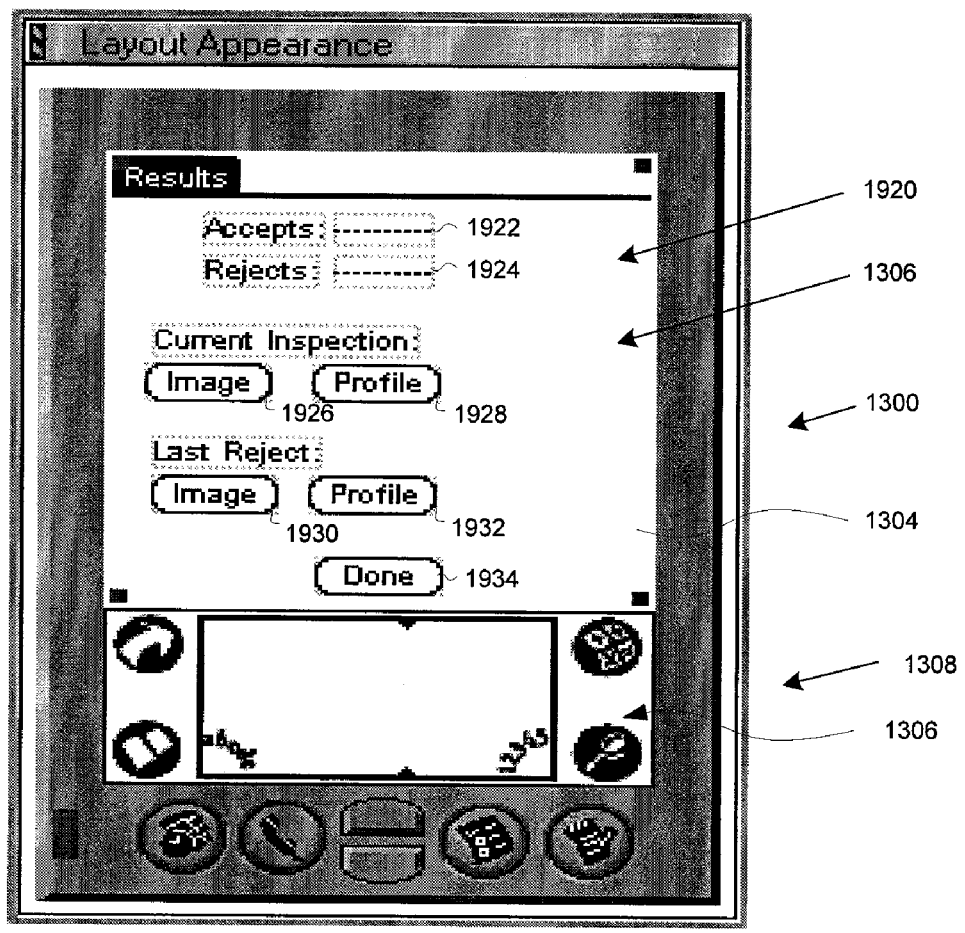

As shown in FIG. 18, activating the Train Results button 1330 on the Setup screen 1520 (FIG. 15) displays the Train Results screen 1820. This screen provides a window 1822 with the current Train Status (Trained OK, Not Trained or Trained Failed) as described above (refer to FIG. 16). Training allows the user to provide a live sample which is stored as a pattern. The pattern is then used for subsequent pattern-recognition and for deciding whether to accept or reject a runtime pattern. For the exemplary gear application, significant training data relevant to the shape is displayed including Average Diameter 1824, Number of Teeth 1826 and general Score 1828 versus preloaded application rules and parameters. Buttons for accessing the Image and its Profile 1830, 1832. A Done button 1834 is also provided.

Finally, a Results screen 1920 is accessed by activating the Main screen (FIG. 14) Results button 1428. This screen, like its above-described web-based counterpart (see FIG. 12), has windows displaying the Accepts and Rejects 1922 and 1924, respectively. This screen also allows the user to access useful data, such as an Image 1926 or Profile 1928 of the most current inspection subject. Likewise, the application stores (in the sensor or PDA) the Image 1930 and Profile 1932 of at least the last rejected subject. The number of images/profiles (or other historical data) stored for review is dependent upon the memory in the MVS or PDA. In one embodiment, it is contemplated that the number of stored data, and their frequency can be varied by appropriate user input. A Done button 1934 is also provided to return to the Main screen 1420 (FIG. 14).

V. Interface with Other Devices

Referring again to FIG. 2, the communication interface 232 is shown operatively connected to other devices such as a robot controller, and the like. It is contemplated that an appropriate communication interface 290 and associated drivers (serial, network, parallel, or wireless) can be provided to the controller 240. Based upon a link 292 between the sensor's communication interface 232 and controller's interface 290 a two-way communication can be established in which control information is fed to the controller and feedback information (e.g. force, edge detection, movement, etc.) is returned over the link to the sensor affect a complex control procedure for the device. This arrangement therefore enables more-sophisticated control by the sensor than a simple on/off command. For example, the exact movement coordinates for the device can be provided by the sensor, based upon viewed, real-time images. These images can include recognition of the device manipulator or a fiducial within the field of view. Appropriate pattern recognition tools and controller applications can be included in the overall machine vision application loaded on the sensor's memory 282. These are accessed for installation, configuration and monitoring using appropriate GUI screens generated by the sensor as described above.

A variety of communication protocols used to transfer data to a device controller 240 over the link 292, one of which protocol is TCP/IP. An appropriate "device services" (not shown) block can be provided in the layer above the generic application interface (406 in FIG. 4) to handle the formatting and packetizing/depacketizing of communications between the sensor and device controller. Depending upon the computing power, programmability and speed of the device controller, the handling of data can be appropriately balanced between the sensor and the device. For example, where the device has little ability to reformat transmitted and received data, the bulk of this function can be carried out on the sensor end. This arrangement, thus, further illustrates the versatility and power of a sensor having integrated processing and communication capabilities according to this invention.

The foregoing has been a detailed description of embodiments of the invention. Various modifications and additions can be made without departing from the spirit and scope thereof. For example, the division of processing responsibilities between the HMI device and sensor can be widely varied. Where an HMI device and/or communication link is improved to take on further functions without degrading speed, such functions can be loaded onto the HMI device. The GUI pages and screens shown and described herein are only exemplary and a variety of screens tailored to the particular machine vision application(s) can be implemented. In addition, it is expressly contemplated that any of the functions and operations described herein can be implemented in hardware, software including of program instructions executing on a computer, or a combination of hardware and software. Further, while a form of data compression and reformatting is typically used to transmit image data and information between the remote interface and the HMI, it is expressly contemplated, that the data may be uncompressed and/or unreformatted in certain embodiments, where the HMI and communication media are appropriately configured and sufficiently powerful. Also, while the above-described machine vision applications and processes may be trainable, it is expressly contemplated that the principles herein can be applied to certain non-trainable applications and processes, such as, for example, systems that search for specific, highly optimized alignment targets. Similarly, where the term "application" or "software" is used, it should be taken broadly to include both processes implemented as instructions on a processor or hardware-based routines running, in whole or part, on for example hardware such as a digital signal processor or application-specific integrated circuit. Accordingly, this description is meant to be taken only by way of example, and not to otherwise limit the scope of the invention.

What is claimed is:

1. A human/machine interface for a machine vision system having an image element that generates image data based upon a viewed object comprising:

a processing element and a memory operatively connected to the image element and including (a) a machine vision tool for performing a machine vision process on the image data and (b) a software process for transmitting, in a web-browser compatible form, the image data and information from the machine vision tool over a communications interface, interconnected to the processing element, to a human/machine interface device having a display, the web-browser-compatible image data and information being adapted for display on the human/machine interface device, and wherein the human/machine interface device is adapted to display the web-browser-compatible image data and information on a plurality of user-selected screens associated with the machine vision tool, the screens being constructed and arranged for selecting functions for training the machine vision system to define measured parameters of the viewed object and at least one of installing, configuring, monitoring, and controlling the machine vision system, and wherein the processing element is adapted to perform a machine vision tool task while the human/machine interface device is disconnected from the communications interface; and wherein the processing element includes a web server to allow the human/machine interface to setup and control the processor, and wherein the human/machine interface device comprises a computer having a generic web browser and the screens comprise web pages.

2. The human/machine interface as set forth in claim 1 wherein the software process includes a data compression and reformatting process for the image data that causes the image data to be transmitted in compressed form over the communications interface.

3. A human/machine interface for a machine vision system having an image element that generates image data based upon a viewed object comprising:

a processing element and a memory operatively connected to the image element and including (a) a machine vision tool for performing a machine vision process on the image data and (b) a software process for transmitting the image data and information from the machine vision tool over a communications interface, interconnected to the processing element, to a human/machine interface device having a display, and the image data and information being adapted for display on the human/machine interface device, and wherein the human/machine interface device is adapted to display the image data and the information on a plurality of user-selected screens associated with the machine vision tool, the screens being constructed and arranged for selecting functions for training the machine vision system to define measured parameters of the viewed object and at least one of installing, configuring, monitoring, and controlling the machine vision system and wherein the processing element is adapted to perform a machine vision tool task while the human/machine interface device is disconnected from the communications interface; and wherein the processing element includes an interface element in the camera to allow the human/machine interface to setup and control the processor from a remote location, and the human/machine interface device comprises a personal digital assistant (PDA).

4. The human/machine interface as set forth in claim 3 wherein the communication interface includes support for data transmission to a PDA over one of a wireless link and a cable link.

5. The human/machine interface as set forth in claim 3 wherein the human/machine interface device includes a generic machine vision application residing thereon and the processing element is adapted to install a specialized machine vision application over the communications interface to the human/machine interface device.

6. The human/machine interface as set forth in claim 3 wherein the machine vision tool includes a process that determines an intensity distribution of the image data and that transmits information with respect to the determined intensity distribution, and wherein the human/machine interface device includes a process for displaying, based upon the information, a visual representation of the intensity distribution so as to assist in adjusting at least one of lighting intensity, shutter exposure time, lens aperture, and parameters affecting the intensity distribution in the image data.

7. The human/machine interface as set forth in claim 3 wherein the machine vision tool includes a process that determines a relative degree of focus of the image data and that transmits encoded information with respect to the determined relative degree of focus, and wherein the human/machine interface device includes a process for displaying, based upon the encoded information, a current focus value so as to assist in adjusting focus.

8. The human/machine interface as set forth in claim 7 wherein the current focus value is displayed as a function of time.

9. The human/machine interface as set forth in claim 7 wherein the human/machine interface device includes a display that is insufficient in resolution and refresh rate to provide a real time display for adjusting either of focus or aperture of lens of the image element.

10. The human/machine interface as set forth in claim 3 wherein the software process includes a data compression and reformatting process for the image data that causes the image data to be transmitted in compressed form over the communications interface.

11. A method for interfacing with a machine vision system having an image element that generates image data based upon a viewed object, the method comprising the steps of:
provideing a processing element and a memory operatively connected to the image element and including (a) a machine vision tool for performing a machine vision process on the image data and (b) a software process for providing the image data in a web-browser-compatible form and for creating information for constructing interface web pages associated with operation of the machine vision tool;
transmitting the image data and information over a communications interface, interconnected to the processing element, to a human/machine interface device having a display and a generic web browser application;
receiving the image data and information and displaying, on the human machine interface device, the image data and information on a plurality of user-selected screens, the screens comprising web pages constructed and arranged for selecting functions for training the machine vision system to define measured parameters of the viewed object and at least one of installing, configuring, or monitoring the machine vision system where the human/machine interface connects remotely to setup and control the processor through a web server residing within the camera; and
performing, with the processing element, a machine vision tool task while the human/machine interface device is disconnected from the communications interface.

12. The method as set forth in claims 11 wherein further comprising transferring configuration information from the human/machine interface device to the memory over the communications interface.

13. The method as set forth in claim 12 wherein the step of transferring configuration information includes providing training information to the memory.

14. The method as set forth in claim 13 wherein the step of displaying includes monitoring a live image acquired by the image element based upon the image data and information.

15. The method as set forth in claim 11 wherein the step of establishing the link comprises opening web pages on the human/machine interface based upon a web server in the machine vision system that interacts with the communications interface to convert the image data and information into web-based data packets.

16. The method as set forth in claim 11 further comprising communicating control information to a remote device through the communication interface so as to direct a device function in accordance with the predetermined instruction of the machine vision tool.

17. The human/machine interface as set forth in claim 11 wherein the software process includes a data compression and reformatting process for the image data that causes the image data to be transmitted in compressed form over the communications interface.

18. A method for interfacing with a machine vision system having an image element that generates image data based upon a viewed object, the method comprising the steps of:
providing a processing element and a memory operatively connected to the image element and including (a) a machine vision tool for performing a machine vision process on the image data and (b) a software process for providing the image data in a transmittable form and for creating information for constructing interface screens associated with operation of the machine vision tool;
transmitting the compressed and reformatted image data and information over a communications interface, interconnected to the processing element, to a human/machine ii interface device, the human/machine interface comprising a personal digital assistant (FDA) having a display and a graphical user interface (GUI);
receiving the compressed and reformatted image data and information and displaying, on the human machine interface device, the compressed and reformatted image data and information on a plurality of user-selected screens associated with the machine vision tool, the screens being constructed and arranged for selecting functions for training the machine vision system to define measured parameters of the viewed object and at least one of installing, configuring, monitoring, and controlling the machine vision system, where the human/machine interface connects remotely to setup and control the processor through an interface element within the camera; and
performing, with the processing element, a machine vision tool task while the human/machine interface device is disconnected from the communications link.

19. The method as set forth in claim 18 wherein the step of transmitting includes providing the image data and information over one of a wireless link and a cable link.

20. The method as set forth in claim 18 further comprising transferring a machine vision application from the memory over the link to the human machine interface device and installing the loadable machine vision application on the human/machine interface so as to interface with the machine vision system using the loadable machine vision application.

21. The method as set forth in claim 18 further comprising communicating control information to a remote device through the communication interface so as to direct a device function in accordance with a predetermined instruction of the machine vision tool.

22. The human/machine interface as set forth in claim 18 further comprising determining, with the machine vision tool, an intensity distribution of the image data and transmitting information with respect to the determined intensity distribution, and displaying, based upon the information, a visual representation of the intensity distribution with the human/machine interface device so as to assist in adjusting at least one of lighting intensity, shutter exposure time, lens aperture, and parameters affecting the intensity distribution in the image data.

23. The human/machine interface as set forth in claim 18 further comprising determining, with the machine vision tool, a relative degree of focus of the image data and transmitting encoded information with respect to the determined relative degree of focus, and displaying, based upon the encoded information, a current focus value with the human/machine interface device so as to assist in adjusting focus.

24. The human/machine interface as set forth in claim 23 wherein the step of displaying the current focus value includes displaying the current focus value as a function of time.

25. The human/machine interface as set forth in claim 18 wherein the software process includes a data compression and reformatting process for the image data that causes the image data to be transmitted in compressed form over the communications interface.

26. A machine vision tool with a human/machine interface device, comprising:
the machine vision tool including a camera for collecting image data of an object, wherein the image data includes evaluation of the object;
a processor coupled into the machine vision tool, wherein the processor includes a web server, and a software process adapted to transmit the image data as a web-browser-compatible form to the unconnected human/machine interface device, and wherein the processor and the machine vision tool are adapted to perform a machine vision tool task while the human/machine interface device is unconnected from the processor and machine vision tool; and
the human/machine interface device using a web-browser set of screens, the set of screens constructed and arranged to for selecting functions for training the machine vision system to define measured parameters of the viewed object and at least one of installing, configuring, monitoring, and controlling the machine vision system, and where the human/machine interface is adapted to setup and control the processor through the web server using a wireless connection.

27. The machine vision system of claim 1, wherein training further includes defining a predetermined threshold for detecting when the measured parameters are outside a defined range.

28. The machine vision system of claim 3, wherein training further includes defining a predetermined threshold for detecting when the measured parameters are outside a defined range.

29. The method for interfacing with a machine vision system of claim 11, wherein training further includes defining a predetermined threshold for detecting when the measured parameters are outside a defined range.

30. The method for interfacing with a machine vision system of claim 18, wherein training further includes defining a predetermined threshold for detecting when the measured parameters are outside a defined range.

31. The machine vision tool of claim 26, wherein training further includes defining a predetermined accept/reject threshold with respect to the defined shape of the viewed object.

* * * * *